(12) United States Patent
Nakayama et al.

(10) Patent No.: US 10,738,197 B2
(45) Date of Patent: Aug. 11, 2020

(54) OPTICAL MEMBER AND METHOD FOR MANUFACTURING THE SAME

(71) Applicant: CANON KABUSHIKI KAISHA, Tokyo (JP)

(72) Inventors: Tomonari Nakayama, Yokohama (JP); Kenji Makino, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 15/259,707

(22) Filed: Sep. 8, 2016

(65) Prior Publication Data
US 2017/0073524 A1    Mar. 16, 2017

(30) Foreign Application Priority Data

Sep. 11, 2015  (JP) ................. 2015-180066
Sep. 11, 2015  (JP) ................. 2015-180067

(51) Int. Cl.
| | |
|---|---|
| *C09D 5/00* | (2006.01) |
| *C03C 17/00* | (2006.01) |
| *G02B 1/111* | (2015.01) |
| *G02B 1/18* | (2015.01) |
| *B05D 1/00* | (2006.01) |
| *B05D 1/18* | (2006.01) |

(Continued)

(52) U.S. Cl.
CPC .............. *C09D 5/006* (2013.01); *B05D 1/18* (2013.01); *B05D 1/28* (2013.01); *C03C 17/42* (2013.01); *C09D 1/00* (2013.01); *C09D 127/18* (2013.01); *G02B 1/111* (2013.01); *G02B 1/18* (2015.01); *B05D 1/005* (2013.01); *B05D 1/60* (2013.01); *B05D 5/086* (2013.01); *B05D 2203/35* (2013.01); *B05D 2601/22* (2013.01); *C03C 2217/425* (2013.01); *C03C 2217/445* (2013.01); *C03C 2217/478* (2013.01); *C03C 2217/734* (2013.01); *C03C 2217/75* (2013.01); *C08K 3/36* (2013.01); *C08K 9/08* (2013.01); *G02B 27/0006* (2013.01); *G02B 2207/107* (2013.01)

(58) Field of Classification Search
CPC .......... C09D 5/006; G02B 1/18; G02B 1/111; G02B 27/0006; G02B 2207/107
See application file for complete search history.

(56) References Cited

U.S. PATENT DOCUMENTS

| | | | |
|---|---|---|---|
| 5,415,927 A * | 5/1995 | Hirayama | ............... B32B 17/06 428/307.3 |
| 5,476,717 A | 12/1995 | Floch | |

(Continued)

FOREIGN PATENT DOCUMENTS

| | | |
|---|---|---|
| CN | 101470218 A | 7/2009 |
| CN | 102472842 A | 5/2012 |

(Continued)

*Primary Examiner* — Hai Vo
(74) *Attorney, Agent, or Firm* — Canon U.S.A., Inc. IP Division

(57) ABSTRACT

An optical member includes a substrate and an antireflection film on the substrate. The antireflection film includes a porous layer at the surface thereof. The porous layer contains silicon oxide particles and a binder. The porous layer is provided with a fluororesin on at least part of the surface of the porous layer. The contact angle of n-hexadecane on the surface of the antireflection film is in the range of 50° to 80°.

27 Claims, 12 Drawing Sheets

(51) Int. Cl.
  *B05D 1/28* (2006.01)
  *C09D 1/00* (2006.01)
  *C09D 127/18* (2006.01)
  *G02B 27/00* (2006.01)
  *C08K 3/36* (2006.01)
  *C03C 17/42* (2006.01)
  *B05D 5/08* (2006.01)
  *C08K 9/08* (2006.01)

(56) References Cited

U.S. PATENT DOCUMENTS

| | | | |
|---|---|---|---|
| 8,088,475 B2 | 1/2012 | Sasaki | |
| 9,914,850 B2 * | 3/2018 | Ogane | C09D 171/00 |
| 2006/0269724 A1 * | 11/2006 | Ohashi | G02B 1/111 |
| | | | 428/143 |
| 2009/0075074 A1 | 3/2009 | Horio | |
| 2012/0189828 A1 | 7/2012 | Inomata | |
| 2013/0216820 A1 * | 8/2013 | Riddle | C09D 4/00 |
| | | | 428/313.9 |
| 2014/0022644 A1 | 1/2014 | Hao | |
| 2014/0037841 A1 * | 2/2014 | Jewhurst | G02B 1/113 |
| | | | 427/164 |
| 2017/0283316 A1 * | 10/2017 | Meuler | C03C 17/42 |

FOREIGN PATENT DOCUMENTS

| | | |
|---|---|---|
| CN | 103201331 A | 7/2013 |
| CN | 103328382 A | 9/2013 |
| CN | 103518148 A | 1/2014 |
| JP | H10-090503 A | 4/1998 |
| JP | 2002-311205 A | 10/2002 |
| JP | 2008-158023 A | 7/2008 |
| JP | 2009-211078 A | 9/2009 |
| JP | 2010-134090 A | 6/2010 |
| JP | 2010217699 A | 9/2010 |
| WO | 2005/001525 A1 | 1/2005 |
| WO | 2008/038714 A1 | 4/2008 |
| WO | 2008/117652 A1 | 10/2008 |
| WO | 2016/069239 A2 | 5/2016 |

* cited by examiner

OPTICAL MEMBER AND METHOD FOR MANUFACTURING THE SAME

BACKGROUND OF THE INVENTION

Field of the Invention

The present disclosure relates to an optical member having good optical properties and a method for manufacturing the same.

Description of the Related Art

It has been known that optical elements are provided with an antireflection film including an optical film having a varying refractive index or a plurality of optical films having different refractive indices to prevent reflection at the interface of the optical element through which light enters or is emitted. Such an antireflection film is formed by vacuum deposition, such as vapor deposition or sputtering, or wet film forming, such as dip coating or spin coating.

In general, the surface layer of the antireflection film is formed of a transparent material having a low refractive index. such materials include inorganic materials such as silicon oxide, magnesium fluoride, and calcium fluoride, and organic materials such as silicone resin and amorphous fluororesin.

It has recently been known to use a low refractive index film containing air, whose refractive index is 1.0, as the antireflection film. By forming pores in a silicon oxide or magnesium fluoride layer, the refractive index of the film can be reduced. For example, by forming pores with a percentage of 30% by volume in a magnesium fluoride thin film having a refractive index of 1.38, the refractive index can be reduced to 1.27.

For increasing the number of pores in a known process, silicon oxide hollow particles or nonspherical silicon oxide particles such as chainlike silicon oxide particles are used.

Japanese Patent Laid-Open No. 2010-217699 discloses an antifouling low refractive index film made up of silicon oxide particles and a binder containing fluorine compound.

U.S. Pat. No. 8,088,475 discloses an anti-reflecting membrane including a layer made of particles, coated with a liquid-repellent surface layer made of a fluorine compound.

Unfortunately, the low refractive index film disclosed in Japanese Patent Laid-Open No. 2010-217699 contains the fluorine compound with a high proportion to the silicon oxide particles to impart an antifouling property and, accordingly, exhibits a high reflectance.

In The antireflection film disclosed in U.S. Pat. No. 8,088,475, the particle layer is not completely covered with the fluorine compound. If dirt is attached to the particle layer, the dirt will spread through the pores among the particles and thus degrade the optical properties of the membrane.

SUMMARY OF THE INVENTION

According to an aspect of the disclosure, there is provided an optical member including a substrate and an antireflection film on the substrate. The antireflection film includes a porous layer at the surface thereof. The porous layer contains silicon oxide particles and a binder. The porous layer is provided with a fluororesin on at least part of the surface of the porous layer. In this structure, the contact angle of n-hexadecane on the surface of the antireflection film is in the range of 50° to 80°.

According to another aspect of the disclosure, a method is provided for manufacturing an optical member including a substrate and an antireflection film having a surface defined by a porous layer. The method includes forming on the substrate a porous layer in which silicon oxide particles are bound to each other with a binder, and attaching a fluororesin onto the porous layer.

Further features of the present invention will become apparent from the following description of exemplary embodiments with reference to the attached drawings.

DESCRIPTION OF THE EMBODIMENTS

The present disclosure relates to an optical member including an antifouling, low-reflectance antireflection film and a method for manufacturing the same.

The optical member of the present disclosure includes a substrate and an antireflection film on the substrate. The antireflection film includes a porous layer at the surface thereof. The porous layer contains silicon oxide particles and a binder and is partially or entirely provided with a fluororesin.

The subject matter of the disclosure will be further described in detail.

First Embodiment

Optical Member

Figure 1:
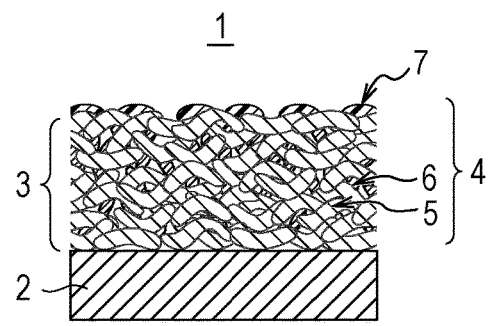
FIG. 1 is a schematic view of an optical member according to a first embodiment of the present disclosure.

FIG. 1 is a schematic view of an optical member according to an embodiment of the present disclosure.

The optical member 1 includes a substrate 2, and an antireflection film 4 having a porous layer 3 on the substrate 2. The porous layer 3 contains chainlike silicon oxide particles 5 and a binder 6.

In the porous layer 3, as shown in FIG. 1, the chainlike silicon oxide particles 5 are bound to each other with the binder 6. The porous layer 3 is provided with a fluororesin 7 thereon.

In the porous layer 3, the chainlike silicon oxide particles 5 may be in contact with each other or may be indirectly bound to each other with the binder 6 therebetween. Advantageously, the chainlike silicon oxide particles 5 are in contact with each other from the viewpoint of enhancing wear resistance of the porous layer 3.

Figure 2:
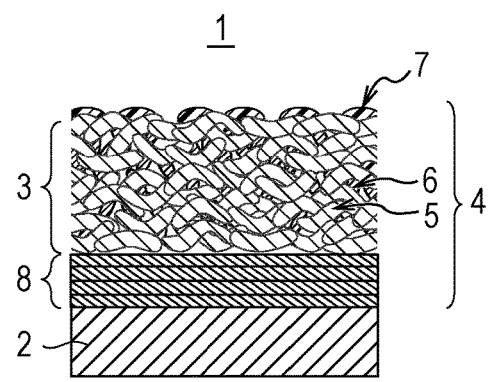
FIG. 2 is a schematic view of a modification of the optical member according to the first embodiment of the present disclosure.

FIG. 2 is a schematic view of a modification of the optical member 1 according to the present embodiment. In the structure shown in FIG. 2, an oxide layer 8 is disposed between the substrate 2 and the porous layer 3 of the antireflection film 4. Advantageously, the oxide layer 8 has a multilayer structure including a high refractive index layer and a low refractive index layer. The high refractive index layer may contain zirconium oxide, titanium oxide, tantalum oxide, niobium oxide, or hafnium oxide. The low refractive index layer may contain silicon oxide or magnesium fluoride.

The optical member of the present embodiment may be used for optical lenses, optical mirrors, filters, or optical films. The optical member is particularly suitable for optical lenses.

Substrate

The substrate 2 may be made of glass or a resin. Also, the substrate 2 has any shape without particular limitation and may have a flat, curved, or recessed surface or may be in the form of a film.

Chainlike Silicon Oxide Particles

A chainlike silicon oxide particle 5 is a chain or string formed of a plurality of silicon oxide particles. The chainlike silicon oxide particles 5 maintain the form of a chain or string even after being formed into a film. Therefore, the use of chainlike silicon oxide particles can increase the porosity compared to the case of using discrete particles. In addition, the particles forming a chain can each be small and are not likely to form a void.

The average particle size of the chainlike silicon oxide particles 5 may be in the range of 10 nm to 60 nm and is desirably in the range of 10 nm to 50 nm, such as 12 nm to 30 nm. If the average particle size of the chainlike silicon oxide particles 5 is less than 10 nm, the pores among the particles and in the particles can be so small that the refractive index cannot be reduced. In contrast, if the average particle size exceeds 60 nm, large pores are formed among the particles, and accordingly, a large void is likely to be formed. In addition, such large particles disadvantageously cause scattering. The average particle size of silicon oxide particles mentioned herein refers to the average Feret diameter. The average Feret diameter can be determined by image processing of transmission electron micrographs. For the image processing, a commercially available image processing apparatus, such as image Pro PLUS (manufactured by Media Cybernetics), may be used. More specifically, Feret diameters of particles in a specific image region, whose contrast may be adjusted if necessary, are measured and averaged.

The number of particles forming a chainlike particle is in the range of 2 to 10 and is advantageously in the range of 3 to 6. If the number of particles forming a chain exceeds 10, a void is likely to be formed, and accordingly wear resistance is degraded. The particle size of particles having a minor and a major axis such as chainlike particles is defined by the minor axis.

The chainlike silicon oxide particles 5 mainly contain $SiO_2$, and Si accounts for desirably 80 atomic percent or more, more desirably 90 atomic percent or more, of all the elements in the chainlike silicon oxide particles except oxygen. If the Si content is less than 80 atomic percent, silanol (Si—OH) groups at the surfaces of the particles, which will react with the binder 6, are reduced, and consequently, the wear resistance of the resulting layer is degraded.

In addition to $SiO_2$, another metal oxide such as $Al_2O_3$, $TiO_2$, $ZnO_2$, or $ZrO_2$, or an organic component such as an alkyl group or an alkyl fluoride group may be introduced into the chainlike silicon oxide particles 5 or to the surfaces of the silicon oxide particles. In view of the reactivity between the particles and the binder and the maintenance of low refractive index, it is advantageous to use hydrophilic particles whose silanol groups on the surfaces thereof remain 70% or more. More advantageously, silanol groups remains 90% or more on the surfaces of the particles. If the silanol groups on the surfaces of the particles are reduced to less than 70% by surface modification with organic groups, the hydrophilicity of the particles is lost. Consequently, the interaction and reactivity between the particles and the binder are reduced, and accordingly, the strength of the resulting layer is reduced.

The porous layer 3 may further contain another type of silicon oxide particles other than chainlike silicon oxide particles, such as spherical silicon oxide particles or hollow silicon oxide particles. From the viewpoint of taking advantage of the features of the chainlike particles, the chainlike silicon oxide particle content in the porous layer is 50% by mass or more, and is desirably 80% by mass or more.

Binder

The binder 6 may be selected according to the wear resistance, adhesion and environmental reliability of the antireflection film. Silicon oxide binders are advantageous because they have affinity with the silicon oxide particles 5 and can increase the wear resistance of the porous layer 3. A hydrolysis-condensation product of silicate is particularly advantageous among the silicon oxide binders.

Desirably, the silicon oxide binder has a polystyrene-equivalent weight average molecular weight in the range of 500 to 3000. If the weight average molecular weight is less than 500, the cured porous layer tends to be cracked, or the stability of the binder solution or liquid to be applied is degraded. In contrast, if the weight average molecular weight exceeds 3000, the viscosity of the binder is increased. Consequently, nonuniform voids are likely to be formed in the binder phase and, accordingly, large voids are likely to be formed.

The content of the binder 6 in the porous layer 3 is desirably in the range of 2% by mass to 30% by mass, such as in the range of 3% by mass to 20% by mass.

Advantageously, the silicon oxide binder is represented by the following composition formula (1):

$$(SiO_2)_m(SiO_{3/2})_{(1-m)} \quad (1)$$

In formula (1), R3 represents a group selected from the group consisting of alkyl having a carbon number of 1 to 8, alkenyl, alkynyl, and aromatic rings, and these groups may have a substituent of an amino, an isocyanate, a mercapto, or an acryloyl group or a halogen atom. m satisfies $0.90 \leq m \leq 0.99$.

If m in formula (1) is less than 0.9, the hydrophilicity of the binder 6 is reduced. Consequently, the interaction between the binder 6 and the silicon oxide particles 5 is weakened, and the wear resistance of the porous layer 3 is degraded. Desirably, $0.95 \leq m \leq 0.99$ holds true.

Fluororesin

Examples of the fluororesin 7 include perfluoropolyether, polytetrafluoroethylene (PTFE), poly(vinylidene fluoride) (PVDF), perfluoroalkoxy resin (PFA), and copolymers of tetrafluoroethylene and hexafluoropropylene. Other polymers may be used as the fluororesin, including acrylic resin and vinyl resin that have a fluorocarbon group such as a fluoroalkyl or fluoroalkenyl group as a pendant group. It is difficult to form a very thin uniform oil-repellent layer on an uneven or porous surface like the surface of the porous layer 3. Fluororesin can exhibit oil repellency even though it is not in the form of an even layer.

From the viewpoint of having good transparency, being easily applied, and easily forming a very thin oil-repellent layer, acrylic resins having a fluorocarbon group or amorphous tetrafluoroethylene copolymers are advantageous. Acrylic resins having a fluorocarbon group is more advantageously used because they are easy to deposit on the porous layer 3 and in the vicinity of the surface of the porous layer 3 and can enhance the oil repellency of the surface of the porous layer 3. Fluorine compounds such as fluoroalkyl silane are inferior in oil repellency and are therefore not suitable to prevent oil from penetrating or diffusing into the porous layer 3 as an alternative to the fluororesin.

Porous Layer

The porous layer 3 may have a thickness in the range of 80 nm to 200 nm, desirably in the range of 100 nm to 160 nm. A porous layer of less than 80 nm in thickness is unlikely to exhibit good wear resistance, and a porous layer of larger than 200 nm in thickness is unlikely to have a reduced reflectance.

The porosity of the porous layer 3 is desirably in the range of 30% to 50%. A porous layer having a porosity of less than 30% exhibits a high refractive index and may not produce an antireflection effect, and a porous layer having a porosity of higher than 50% is inferior in wear resistance because of the presence of excessively large pores.

Although the porous layer 3 may have a constant porosity from the surface (the upper side in FIG. 1) to the bottom (the side close to the substrate in FIG. 1), the porosity is, desirably, reduced in the direction from the surface to the bottom. If the porosity of the porous layer 3 is varied, it may be regularly varied in the direction from the surface to the bottom or may be irregularly varied.

The refractive index of the porous layer 3 is desirably in the range of 1.19 to 1.35, such as in the range of 1.22 to 1.32.

In the optical member of the present embodiment, the fluororesin 7 is attached to the entire or part of the surface of the porous layer 3. If oil or the like is attached to a porous layer 3 not provided with the fluororesin 7, the oil or the like is likely to penetrate and diffuse into the pores among the silicon oxide particles. The same applied to the oil component in dust or the like. The oil component in dust attached to the porous layer, even though it is not visible, can penetrate and diffuse into the pores among the silicon oxide particles after a time has passed. In this instance, the refractive index of the portion to which the oil component has diffused is varied, and thus a visible defect appears in the resulting optical member.

Since it is difficult to form a very thin uniform film of the fluororesin 7 on the porous layer 3, the fluororesin 7 is, in some cases, formed in an island manner or a dotted matter, or in the form of an uneven layer including thick portions and thin portions. However, the fluororesin 7 can prevent oil from penetrating and diffusing into the porous layer 3 because of the oil repellency of the fluororesin. In this instance, the atomic ratio of fluorine to silicon in the surface of the porous layer 3 is desirably in the range of 0.5 to 3 and is more desirably in the range of 0.7 to 2.6. When the atomic ratio of fluorine to silicon is less than 0.5, the surface of the porous layer 3 may not exhibit sufficient oil repellency, and when it exceeds 3, the fluorine 7 can be excessively applied to form a thick layer or a large domain, thus increasing the refractive index or causing scattering.

It is desirable that a certain amount of the fluororesin 7 enter the region of the porous layer 3 underlying the surface with a large part of the fluororesin 7 remaining in the vicinity of the surface of the porous layer 3. The fluororesin that has entered the porous layer 3 slightly expands the spaces among the chainlike $SiO_2$ particles to give a refractive index distribution, thus reducing the reflectance effectively. If a large amount of the fluororesin 7 enters the porous layer 3, however, the fluororesin can fill the spaces among the chainlike $SiO_2$ particles and thus increase the refractive index, rather than expanding the spaces. On the other hand, if the amount of the fluororesin 7 entering the porous layer 3 is excessively small, the refractive index does not have a distribution, and the reflectance cannot be sufficiently reduced.

Accordingly, the ratio of the fluorine concentration at the surface of the porous layer 3 containing the fluororesin 7 to the fluorine concentration at a depth of 25 nm from the surface is in the range of 4 to 12. More desirably, it is in the range of 5 to 10 If the ratio of the fluorine concentration at the surface to the fluorine concentration at a depth of 25 nm from the surface is less than 4, the surface of the porous layer 3 does not exhibit oil repellency, or the porous layer 3 exhibits an increased refractive index as a whole, hence exhibiting an increased reflectance. If the fluorine concentration ratio exceeds 12, not only the reflectance cannot be sufficiently reduced, but also the reflectance may be increased due to the presence of the fluororesin layer having a high refractive index at the surface.

Advantageously, the contact angle of hexadecane on the surface of the porous layer 3 is in the range of 50° to 80°, more advantageously in the range of 60° to 75°. The contact angle of hexadecane mentioned herein refers to the contact angle of 10 μL of hexadecane dropped on the surface of an antireflection film, measured by a half-angle method (θ/2 method). If the contact angle of hexadecane is less than 50°, oil is not sufficiently prevented from diffusing.

Advantageously, the contact angle of water with the surface of the porous layer 3 is in the range of 100° to 130°, more advantageously in the range of 110° to 120°.

The increment of the refractive index of the entire porous layer 3 increased by applying the fluororesin is desirably in the range of 0.0075 to 0.02, more desirably in the range of 0.01 to 0.02. If the increment of the refractive index is less than 0.0075, the contact angle of hexadecane is undesirably reduced to less than 50°. If the increment of the refractive index exceeds 0.02, the surface of the porous layer 3 undesirably has a portion having a high refractive index.

Method for Manufacturing Optical Member

A method for manufacturing the optical member 1 according to the present embodiment includes forming the porous layer 3, in which the silicon oxide particles 5 are bound to each other with the binder 6, on the surface of a substrate 2 or the surface of a layer or a multilayer structure disposed on the substrate 2.

For forming the porous layer 3, a dry process or a wet process may be employed. The wet process allows the porous layer 3 to be easily formed and is thus advantageous.

In a wet process for forming the porous layer 3, for example, a dispersion liquid of the silicon oxide particles and a binder solution may be separately applied one after the other, or a dispersion liquid containing both the silicon oxide particles and the binder may be applied. It is advantageous to apply a dispersion liquid containing both the silicon oxide particles and the binder, from the viewpoint of forming a porous layer 3 whose inside has a uniform composition.

The dispersion liquid of the silicon oxide particles is prepared by dispersing the silicon oxide particles in a solvent. The silicon oxide content in this dispersion liquid is desirably in the range of 2% by mass to 10% by mass. The dispersion liquid of the silicon oxide particles 5 may further contain a silane coupling agent or a surfactant for increasing dispersibility. However, if such an additive reacts with the silanol groups at the surfaces of the silicon oxide particles 5, the binding force between the silicon oxide particles 5 and the binder 6 is reduced, and consequently, the wear resistance of the resulting porous layer 3 is reduced. Accordingly, the proportion of the additive such as a silane coupling agent or a surfactant is desirably 10 parts by mass or less, more desirably 5 parts by mass or less, relative to 100 parts by mass of the silicon oxide particles.

Advantageously, a silicon oxide binder solution is used as the binder solution. Silicon oxide binders have a strong binding force with the silicon oxide particles. Advantageously, the silicon oxide binder solution mainly contains a hydrolysis-condensation product of silicate. This solution may be prepared by adding water and an acid or a base to a silicate ester, such as methyl silicate or ethyl silicate, in a solvent for hydrolysis and condensation. The acid used for this reaction may be hydrochloric acid, nitric acid, or the like, and the base may be ammonia or an amine. These are selected in view of solubility in the solvent and reactivity with the silicate ester. Alternatively, the silicon oxide binder solution may be prepared by neutralizing a silicate such as sodium silicate in water for condensation and then diluting the condensate with a solvent. The acid used for the neutralization may be hydrochloric acid, nitric acid, or the like. The binder solution may be prepared while being heated to a temperature of 80° C. or less.

If a silicon oxide binder is used as the binder 6, a trifunctional silane alkoxide substituted by an organic group, such as methyltriethoxysilane or ethyltriethoxysilane, may be added for improving solubility and ease of application. The proportion of the trifunctional silane alkoxide is desirably 10% by mole or less to the total moles of silane alkoxides. If the amount of the trifunctional silane alkoxide added exceeds 10% by mole, the organic groups in the binder hinder the silanol groups from forming hydrogen bonds in the binder, and consequently, the wear resistance of the porous layer is degraded.

The silicon oxide content in the silicon oxide binder solution is desirably in the range of 0.2% by mass to 2% by mass.

If a dispersion liquid containing both the silicon oxide particles and the binder is used, the dispersion liquid may be prepared by mixing a dispersion liquid of the silicon oxide particles and a solution of the binder, or adding the material of the binder into a dispersion liquid of the silicon oxide particles. In the case of the latter process and using a silicon oxide binder as the binder 6, the dispersion liquid containing both may be prepared through a reaction performed by adding ethyl silicate, water, and an acid catalyst into the dispersion liquid of silicon oxide particles. It is advantageous to prepare a binder solution in advance because the dispersion liquid can be prepared while the state of the reaction is being checked.

The proportion of the binder in the dispersion liquid containing both the silicon oxide particles and the silicon oxide binder is desirably in the range of 5 parts by mass to 35 parts by mass, such as 10 parts by mass to 20 parts by mass, relative to 100 parts by mass of the silicon oxide particles.

The solvents for the dispersion liquid of the silicon oxide particles and the silicon oxide binder solution are such that they can uniformly disperse or dissolve the material and does not allow the reaction product to precipitate. Such solvents include monohydric alcohols, such as methanol, ethanol, 1-propanol, 2-propanol, 1-butanol, 2-butanol, 2-methylpropanol, 1-pentanol, 2-pentanol, cyclopentanol, 2-methylbutanol, 3-methylbutanol, 1-hexanol, 2-hexanol, 3-hexanol, 4-methyl-2-pentanol, 2-methyl-1-pentanol, 2-ethylbutanol, 2,4-dimethyl-3-pentanol, 3-ethylbutanol, 1-heptanol, 2-heptanol, 1-octanol, and 2-octanol; dihydric alcohols, such as ethylene glycol and triethylene glycol; ether alcohols, such as methoxyethanol, ethoxyethanol, propoxyethanol, isopropoxyethanol, butoxyethanol, 1-methoxy-2-propanol, 1-ethoxy-2-propanol, and 1-propoxy-2-propanol; ethers, such as dimethoxyethane, Diglyme, tetrahydrofuran, dioxane, diisopropyl ether, dibutyl ether, and cyclopentyl methyl ether; esters, such as ethyl formate, ethyl acetate, n-butyl acetate, ethylene glycol monomethyl ether acetate, ethylene glycol monoethyl ether acetate, ethylene glycol monobutyl ether acetate, and propylene glycol monomethyl ether acetate; aliphatic or alicyclic hydrocarbons, such as n-hexane, n-octane, cyclohexane, cyclopentane, and cyclooctane; aromatic hydrocarbons, such as toluene, xylene, and ethylbenzene; ketones, such as acetone, methyl ethyl ketone, methyl isobutyl ketone, cyclopentanone, and cyclohexanone; chlorinated hydrocarbons, such as chloroform, methylene chloride, carbon tetrachloride, and tetrachloroethane; aprotic polar solvents, such as N-methylpyrrolidone, N,N-dimethylformamide, N,N-dimethylacetamide, and ethylene carbonate. The solvent may be a mixture of two or more of these solvents.

The dispersion liquid of the silicon oxide particles 5 and the solution of the binder 6 or the mixture thereof is applied by, for example, spin coating, blade coating, roll coating, slit coating, printing, or dip coating. If an optical member having recesses or any other three-dimensional complex shape is manufactured, spin coating is advantageous from the viewpoint of forming a uniform thickness.

After the formation of the porous layer 3, it may be dried and/or cured. The operation of drying and/or curing the porous layer 3 is intended to remove the solvent or to promote the reaction between the silicon oxide binder molecules or between the silicon oxide binder and the silicon oxide particles. This operation may be performed at a temperature in the range of 20° C. to 200° C., desirably in the range of 60° C. to 150° C. If the temperature for drying and/or curing is less than 20° C., the solvent will remain in the porous layer and the wear resistance will be reduced. If the temperature for drying or curing exceeds 200° C., the binder will be excessively cured to the extent that it will be likely to be cracked. The time period for drying or curing is desirably in the range of 5 minutes to 24 hours, such as 15 minutes to 5 hours. If the drying or curing time is less than 5 minutes, part of the solvent will remain. Consequently, the in-plane variation in refractive index can be increased. In contrast, if the drying or curing time exceeds 24 hours, the binder will be likely to be cracked.

If the dispersion of the silicon oxide particles and the silicon oxide binder solution are separately applied in that order onto the substrate 2, after the dispersion liquid of the silicon oxide particles has been applied, the coating of the dispersion liquid may be dried and/or fired.

In order to form a porous layer 3 in which the refractive index increases in the direction from the surface thereof to the bottom, desirably, the porous layer 3 is made dry to the touch. Dry to the touch mentioned herein refers to a state where the porous layer 3 has a thickness of 1.04 times to 1.2 times of the thickness of the completely dried layer, with the solvent remaining therein. In general, a porous layer dry to the touch is contracted by being dried and/or cured and thus changed into a layer having a constant porosity and a constant refractive index. However, if a fluororesin is applied to the porous layer 3 dry to the touch, the surface of the porous layer 3 to which the fluororesin is attached is not much contracted even by being dried and/or cured. Consequently, the surface of the porous layer 3 has a higher porosity and a lower refractive index than the bottom.

For attaching the fluororesin onto the porous layer 3, a solution of the fluororesin is applied by, for example, spin coating, blade coating, roll coating, slit coating, printing, or dip coating. The solvent of the fluororesin solution desirably has a high compatibility.

Examples of the solvent suitable for preparing the fluororesin solution include fluorine-containing solvents, such as hydrofluoroether, perfluorocarbon, and a mixture thereof.

The fluororesin content in the solution may be in the range of 0.04% by mass to 0.1% by mass.

After attaching the fluororesin 7, the solvent may be removed by drying. If the porous layer 3 has not been dried or fired before attaching the fluororesin, it is desirable that the fluororesin be dried under the conditions where the porous layer 3 will be dried and/or fired.

EXAMPLES

The subject matter of the invention will be further described in detail with reference to Examples below. The scope of the invention is not limited to the following Examples.

Preparation of Coating Liquids (1) Preparation of Chainlike $SiO_2$ Particle Dispersion Liquid 1

Into 50.00 g of a dispersion liquid of chainlike $SiO_2$ particles in 2-propanol (IPA), IPA-ST-UP (produced by Nissan Chemical Industries, average particle size: 12 nm, solids content: 15% by mass), was added 142.50 g of 1-ethoxy-2-propanol. Then, the IPA was removed by concentrating the mixture in a rotary evaporator to yield chainlike $SiO_2$ particle dispersion liquid 1 (solids content: 5.0% by mass). It was confirmed by dynamic light scattering particle size distribution measurement (with Zetasizer Nano ZS manufactured by Malvern Instruments) that chainlike $SiO_2$ particles of 12 nm in minor axis and 90 nm in major axis were dispersed in the resulting liquid.

(2) Preparation of $SiO_2$ Binder Solution 2

Into 12.48 g of ethyl silicate were added 13.82 g of ethanol and 3% nitric acid aqueous solution. The mixture was stirred at room temperature for 10 hours to yield $SiO_2$ binder solution 2 (solids content: 11.5% by mass). It was confirmed by gas chromatography that the reaction of the ethyl silicate added as a raw material had been completed.

(3) Preparation of Chainlike $SiO_2$ Particle Coating Liquid 3

After 50.00 g of chainlike $SiO_2$ particle dispersion liquid 1 (solids content: 5.0% by mass) was diluted with 65.67 g of 1-ethoxy-2-propanol, 3.26 g of $SiO_2$ binder solution 2 (solids content: 11.5% by mass) was added, followed by stirring at room temperature for 10 minutes. Then, the mixture was stirred at 50° C. for 1 hour to yield chainlike $SiO_2$ particle coating liquid 3. It was confirmed by dynamic light scattering particle size distribution measurement (with Zetasizer Nano ZS manufactured by Malvern Instruments) that chainlike $SiO_2$ particles of 15 nm in minor axis and 95 nm in major axis were dispersed in the resulting liquid.

(4) Preparation of Chainlike $SiO_2$ Particle Coating Liquid 4

After 50.00 g of chainlike $SiO_2$ particle dispersion liquid 1 (solids content: 5.0% by mass) was diluted with 65.67 g of 1-ethoxy-2-propanol, 1.74 g of $SiO_2$ binder solution 2 (solids content: 11.5% by mass) was added. The mixture was stirred at room temperature for 10 minutes and then at 50° C. for one hour to yield chainlike $SiO_2$ particle coating liquid 4. It was confirmed by dynamic light scattering particle size distribution measurement (with Zetasizer Nano ZS manufactured by Malvern Instruments) that chainlike $SiO_2$ particles of 14 nm in minor axis and 93 nm in major axis were dispersed in the resulting liquid.

(5) Preparation of Mixed $SiO_2$ Particle Coating Liquid 5

After 48.00 g of chainlike $SiO_2$ particle dispersion liquid 1 (solids content: 5.0% by mass) and 12 g of a dispersion liquid of solid $SiO_2$ particles in 1-methoxy-2-propanol, PGM-ST (produced by Nissan Chemical Industries, average particle size: 15 nm, solids content: 30% by mass), were diluted together with 55.38 g of 1-ethoxy-2-propanol, 3.13 g of $SiO_2$ binder solution 2 (solids content: 11.5% by mass) was added. The mixture was stirred at room temperature for 10 minutes and then at 50° C. for one hour to yield mixed $SiO_2$ particle coating liquid 5. It was confirmed by dynamic light scattering particle size distribution measurement (with Zetasizer Nano ZS manufactured by Malvern Instruments) that chainlike $SiO_2$ particles and solid $SiO_2$ particles, having peak diameters of 93 nm and 15 nm were mixed and dispersed in the resulting liquid.

Evaluation (6) Measurement of Thickness

Thickness was determined from the results of measurement with a spectroscopic ellipsometer (VASE, manufactured by J. A. Woollam) at wavelengths from 380 nm to 800 nm.

(7) Measurement of Refractive Index

Refractive index was measured with a spectroscopic ellipsometer (VASE, manufactured by J. A. Woollam) at wavelengths from 380 nm to 800 nm. The refractive index at a wavelength of 550 nm was used for evaluation.

(8) Measurement of Reflectance

The absolute reflectance of each sample coating was measured at wavelengths from 400 nm to 700 nm with a reflectance meter USPM-RU (manufactured by Olympus), and the average reflectance and the highest reflectance were determined.

The average reflectance was rated according to the following criteria:
A: 0.05% or lower
B: higher than 0.05% and 0.1% or lower
C: higher than 0.1%

The highest reflectance was rated according to the following criteria:
A: 0.15% or lower
B: higher than 0.15% and 0.25% or lower
C: higher than 0.25%

(9) Evaluation of Contact Angle

The contact angle of 2 µL of pure water or hexadecane droplet on a sample was measured at 23° C. and 50% RH with a full automatic contact angle meter DM-701 (manufactured by Kyowa Interface Science).

The contact angle of pure water was rated according to the following criteria:
A: 110° or more
B: 105° or more and less than 110°
C: less than 105°

The contact angle of hexadecane was rated according to the following criteria:
A: 60° or more
B: 50° or more and less than 60°
C: less than 50°

(10) Measurement of Fluorine Concentrations at the Surface of the Porous Layer and in the Depth Direction and Measurement of the Atomic Ratio of Fluorine to Silicon at the Surface of the Porous Layer The atomic ratio of fluorine to silicon at the surface of the porous layer was determined from the detection intensities measured with an X-ray photoelectron spectrometer Quantera II (manufactured by ULVAC-PHI) with a beam of 100 µm at 25 W and 15 kV. Furthermore, while an area of 2 mm by 2 mm was etched for 30 seconds with an Ar ion beam at an acceleration voltage of 500 V, the same measurement was repeated 10 times and thus the fluorine concentration in the depth direction was determined. It was confirming that the depth of about 25 nm was reached by three etching operations, and the ratio of the fluorine concentration at the surface to the fluorine concentration at a depth of 25 nm from the surface (after three etching operations) was determined.

(11) Infrared Reflection Spectrum of the Fluororesin

The solvent was removed from the fluororesin solution by evaporation under the conditions of 40° C. and 10 hPa, and the infrared spectrum of the remaining fluororesin in the range of 650 cm$^{-1}$ to 4000 cm$^{-1}$ was measured with an infrared absorption spectrometer Spectrum One (manufactured by PerkinElmer) and its universal ATR accessory.

Example 1

Figure 3:
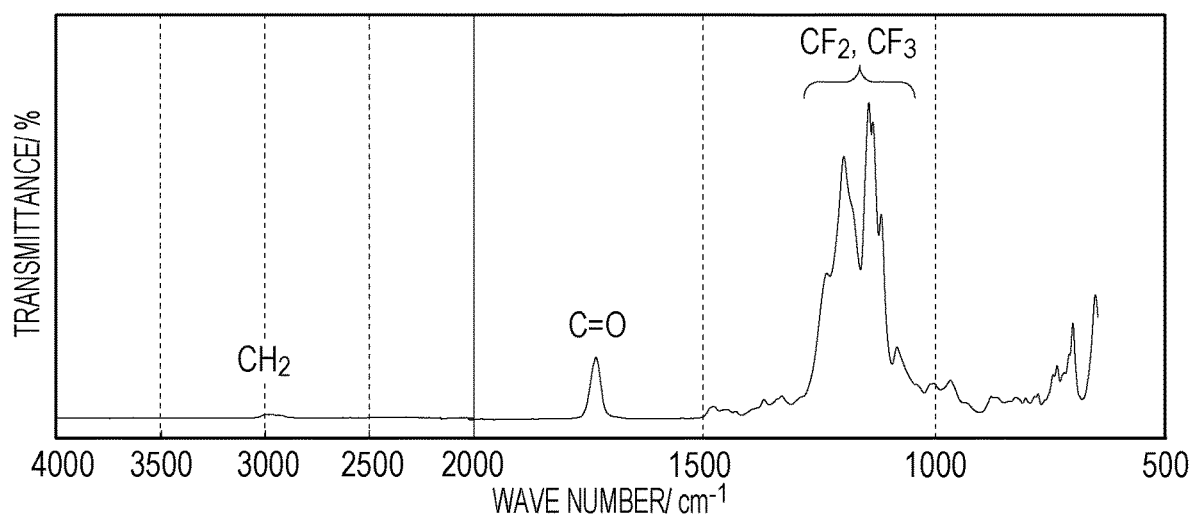
FIG. 3 is an infrared reflection spectrum of the fluororesin used in Example 1.

In Example 1, an appropriate amount of chainlike $SiO_2$ particle coating liquid 3 was dropped onto an oxide multilayer composite formed on a glass substrate (nd=1.52, vd=64.1) of 30 mm in diameter and 1 mm in thickness and was subjected to spin coating at 3200 rpm for 20 s. Table 1 shows the thicknesses and the refractive indices of the layers defining the oxide multilayer composite. Then, an appropriate amount of a solution of an acrylic fluororesin having a fluorinated hydrocarbon group and exhibiting the infrared reflection spectrum shown in FIG. 3, Durasurf DS-1101 S135 (produced by Harves, solids content: 0.10% by mass), was dropped onto the surface of the porous layer of chainlike $SiO_2$ particles formed on the multilayer composite and was subjected to spin coating at 3000 rpm for 20 s. The resulting sample was heated at 140° C. for 30 minutes in a hot air circulation oven to yield a substrate provided with an antireflection film.

Figure 4:
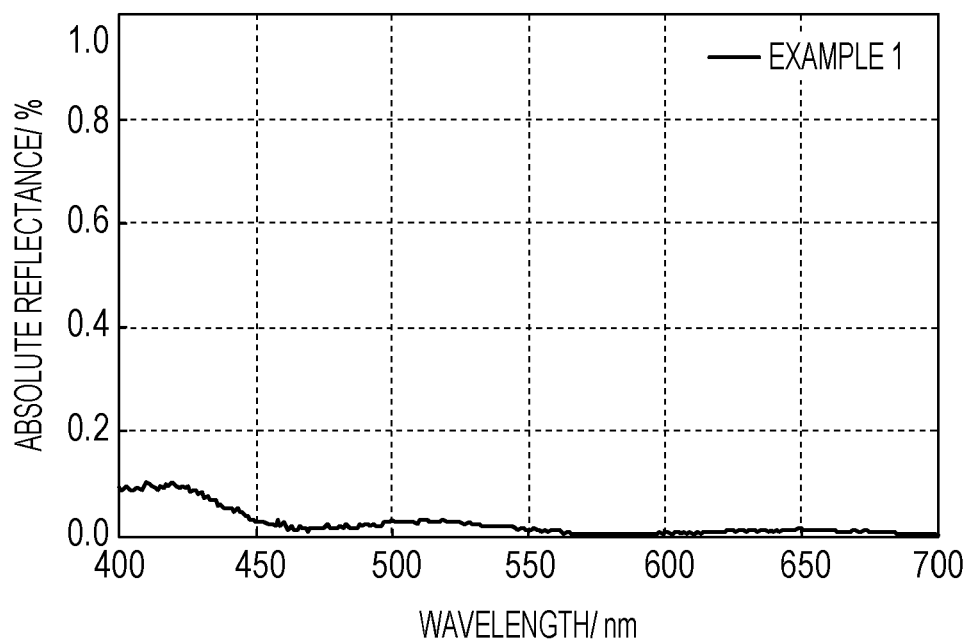
FIG. 4 is a plot of absolute reflectance at the surface of the antireflection film of Example 1.
Figure 5:
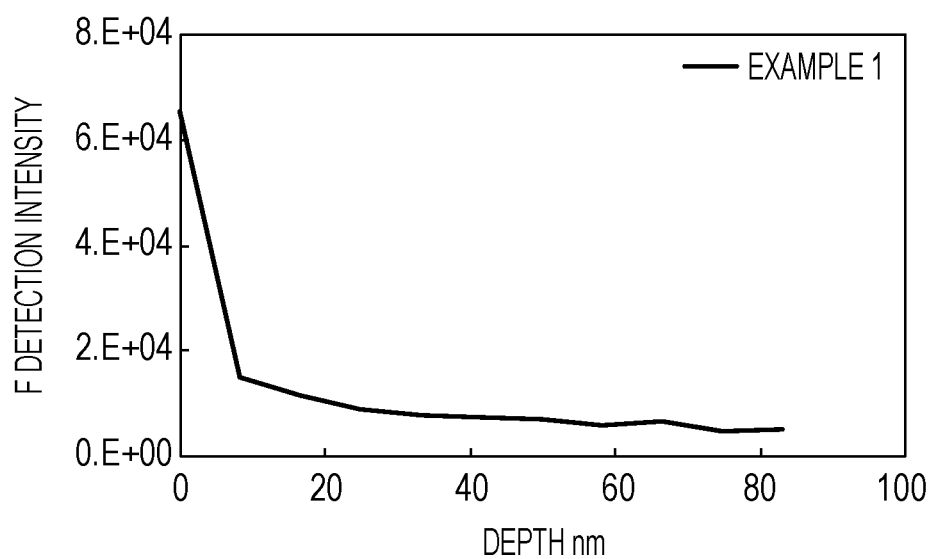
FIG. 5 is a plot of the changes with depth in fluorine content in the porous layer of Example 1.

The average reflectance and the highest reflectance of the antireflection film were 0.02% and 0.10%, respectively. The contact angles of pure water and hexadecane on the surface of the antireflection film were 112° and 68°, respectively. The antireflection film had a portion having a higher fluororesin content at the surface. The portion has a thickness of 4 nm and the underlying porous layer had a thickness of 111 nm. The refractive index was distributed in the range of 1.245 to 1.250 from the surface. The atomic ratio of fluorine to silicon at the surface of the porous layer was 1.83, and the ratio of the fluorine concentration at the surface of the porous layer to the fluorine concentration at a depth of 25 nm from the surface was 7.4. The absolute reflectance is shown in FIG. 4, and the fluorine concentration in the depth direction of the porous layer is shown in FIG. 5. Evaluation results are shown in Table 2.

Example 2

In Example 2, an appropriate amount of chainlike $SiO_2$ particle coating liquid 3 was dropped onto the same oxide multilayer composite as in Example 1 and was subjected to spin coating at 3500 rpm for 20 s. Furthermore, the same fluororesin solution was applied by spin coating onto the surface of the resulting porous layer of chainlike $SiO_2$ particles formed on the multilayer composite in the same manner as in Example 1, and the resulting sample was heated to yield a substrate provided with an antireflection film.

Figure 6:
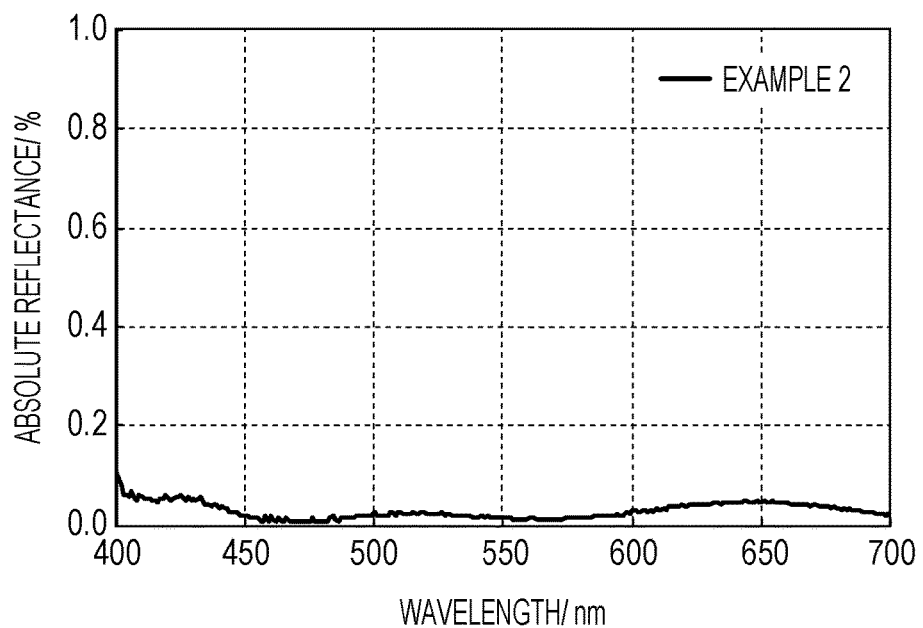
FIG. 6 is a plot of absolute reflectance at the surface of the antireflection film of Example 2.

The average reflectance and the highest reflectance of the antireflection film were 0.03% and 0.11%, respectively. The contact angles of pure water and hexadecane on the surface of the antireflection film were 111° and 68°, respectively. The antireflection film had a portion having a higher fluororesin content at the surface. The portion has a thickness of 4 nm and the underlying porous layer had a thickness of 107 nm. The refractive index was distributed in the range of 1.244 to 1.249 from the surface. The atomic ratio of fluorine to silicon at the surface of the porous layer was 1.79, and the ratio of the fluorine concentration at the surface of the porous layer to the fluorine concentration at a depth of 25 nm from the surface was 7.1. The absolute reflectance was shown in FIG. 6.

Example 3

In Example 3, a porous layer of chainlike $SiO_2$ particles was formed on a multilayer composite having the same structure as in Example 1 in the same manner as in Example 1. Then, an appropriate amount of a solution of the fluororesin in a different solvent from in Example 1, Durasurf DS-1101 TH (produced by Harves, solids content: 0.04% by mass), was dropped onto the surface of the porous layer of chainlike $SiO_2$ particles formed on the multilayer composite. The solution was subjected to spin coating at 5000 rpm for 20 s. The resulting sample was heated at 140° C. for 30 minutes in a hot air circulation oven to yield a substrate provided with an antireflection film.

The average reflectance and the highest reflectance of the antireflection film were 0.03% and 0.10%, respectively. The contact angles of pure water and hexadecane on the surface of the antireflection film were 112° and 67°, respectively. The antireflection film had a portion having a higher fluororesin content at the surface. The portion has a thickness of 3 nm and the underlying porous layer had a thickness of 111 nm. The refractive index was distributed in the range of 1.245 to 1.250 from the surface. The atomic ratio of fluorine to silicon at the surface of the porous layer was 1.80, and the ratio of the fluorine concentration at the surface of the porous layer to the fluorine concentration at a depth of 25 nm from the surface was 6.5.

Example 4

In Example 4, an appropriate amount of chainlike $SiO_2$ particle coating liquid 3 was dropped onto a substrate having the same oxide multilayer composite as in Example 1 and was subjected to spin coating at 3200 rpm for 20 s to yield a porous layer of chainlike $SiO_2$ particles on the substrate. Then, the same fluororesin solution as in Example 3 was sprayed for 1 s with an atomizer having a nozzle diameter of 1 mm at a pressure of 0.2 MPa. The resulting sample was heated at 140° C. for 30 minutes in a hot air circulation oven to yield a substrate provided with an antireflection film.

The average reflectance and the highest reflectance of the antireflection film were 0.02% and 0.11%, respectively. The contact angles of pure water and hexadecane on the surface of the antireflection film were 112° and 68°, respectively. The antireflection film had a portion having a higher fluororesin content at the surface. The portion has a thickness of 5 nm and the underlying porous layer had a thickness of 104 nm. The refractive index was distributed in the range of 1.245 to 1.250 from the surface. The atomic ratio of fluorine to silicon at the surface of the porous layer was 1.88, and the ratio of the fluorine concentration at the surface of the porous layer to the fluorine concentration at a depth of 25 nm from the surface was 5.4.

Example 5

Figure 7:
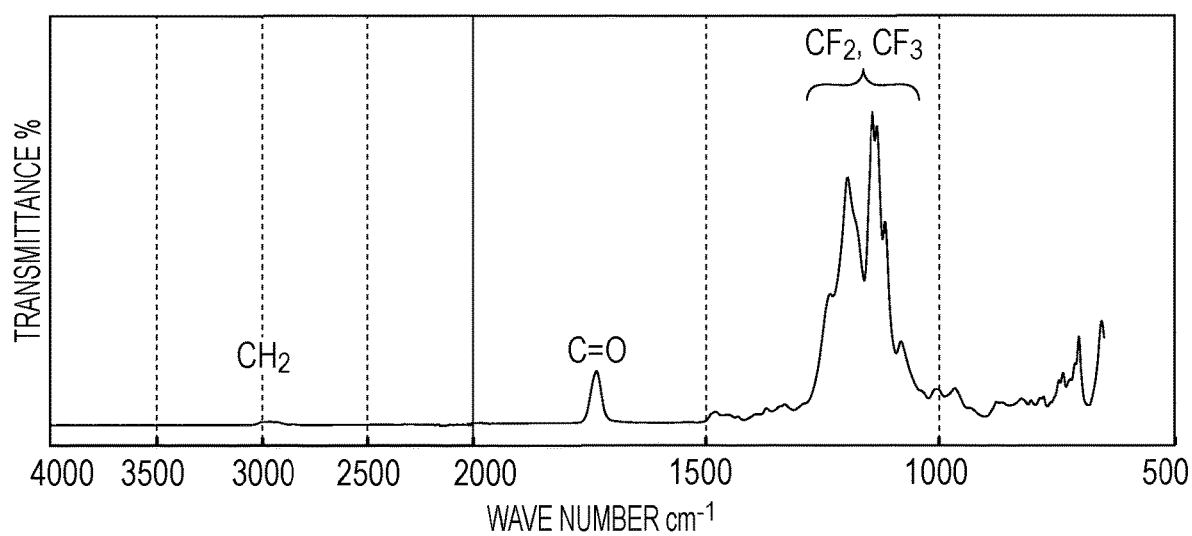
FIG. 7 is an infrared reflection spectrum of the fluororesin used in Example 5.

In Example 5, a porous layer of chainlike $SiO_2$ particles was formed on a multilayer composite having the same structure as in Example 1 in the same manner as in Example 1. Then, an appropriate amount of a solution of an acrylic fluororesin having a structure similar to the fluororesin used in Example 1 and exhibiting the infrared reflection spectrum shown in FIG. 7, Durasurf DS-16005CH (produced by Harves, solids content: 0.05% by mass), was dropped onto the surface of the porous layer of chainlike $SiO_2$ particles formed on the multilayer composite and was subjected to spin coating at 3000 rpm for 20 s. The resulting sample was heated at 140° C. for 30 minutes in a hot air circulation oven to yield a substrate provided with an antireflection film.

The average reflectance and the highest reflectance of the antireflection film were 0.04% and 0.13%, respectively. The contact angles of pure water and hexadecane on the surface of the antireflection film were 113° and 73°, respectively. The antireflection film had a portion having a higher fluororesin content at the surface. The portion has a thickness of 6 nm and the underlying porous layer had a thickness of 110 nm. The refractive index was distributed in the range of 1.245 to 1.250 from the surface. The atomic ratio of fluorine to silicon at the surface of the porous layer was 1.13, and the ratio of the fluorine concentration at the surface of the porous layer to the fluorine concentration at a depth of 25 nm from the surface was 8.0.

Figure 8:
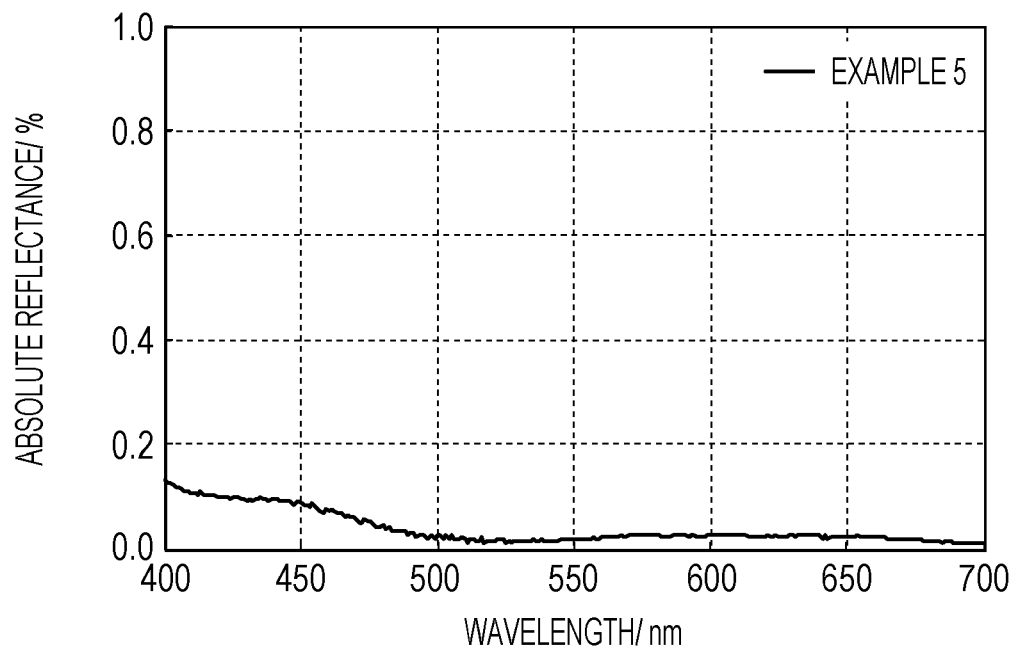
FIG. 8 is a plot of absolute reflectance at the surface of the antireflection film of Example 5.
Figure 9:
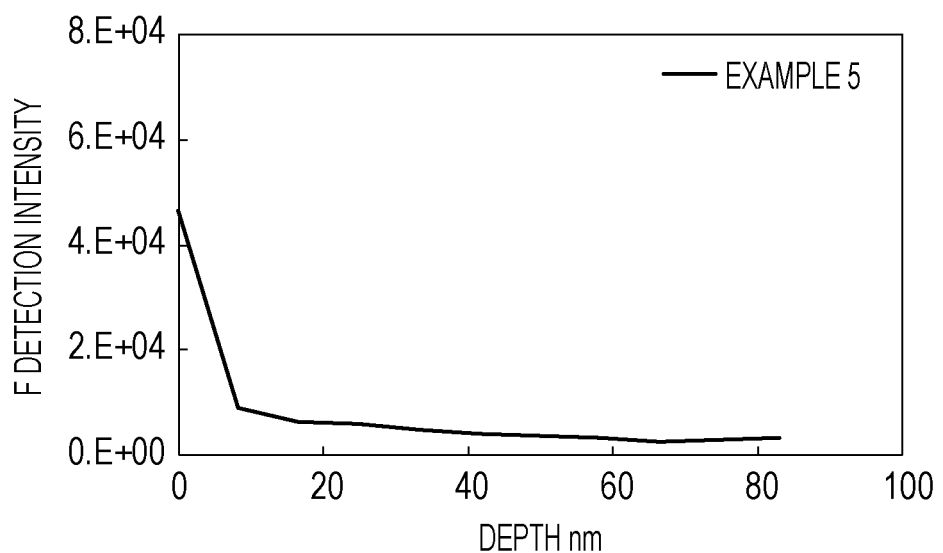
FIG. 9 is a plot of the changes with depth in fluorine content in the porous layer of Example 5.

The absolute reflectance is shown in FIG. 8, and the fluorine concentration in the depth direction of the porous layer is shown in FIG. 9.

Example 6

Figure 10:
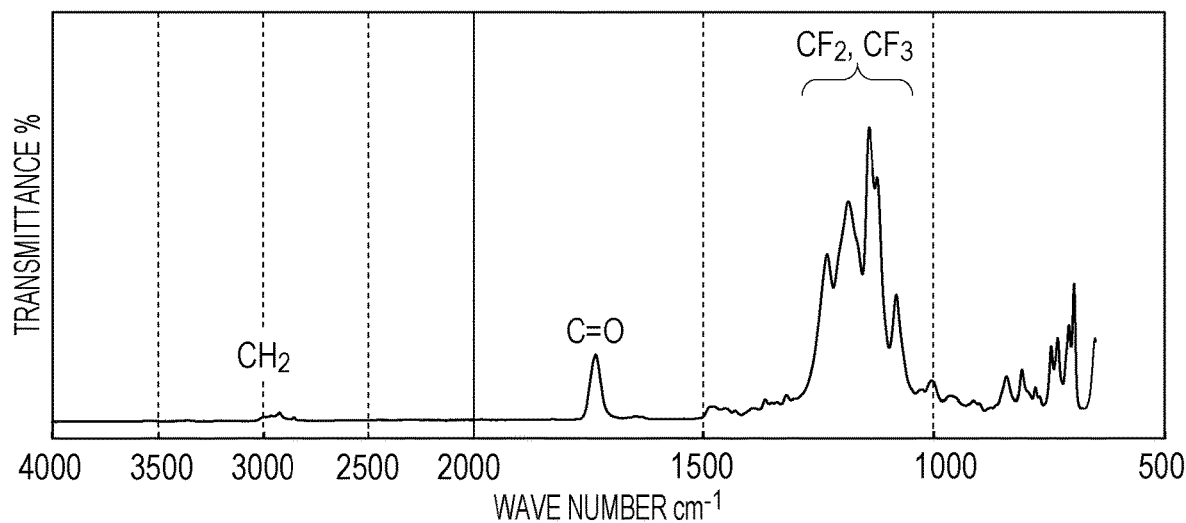
FIG. 10 is an infrared reflection spectrum of the fluororesin used in Example 6.

In Example 6, a porous layer of chainlike $SiO_2$ particles was formed on a multilayer composite having the same structure as in Example 1 in the same manner as in Example 1. Then, a solution of an acrylic fluororesin having a fluorocarbon group and exhibiting the infrared reflection spectrum shown in FIG. 10, SFCOAT SNF-B200A (produced by AGC Seimi Chemical, solids content: 1% by mass), was diluted 10 times with m-xylene hexafluoride. An appropriate amount of the diluted solution was dropped onto the surface of the porous layer of chainlike $SiO_2$ particles formed on the multilayer composite and was subjected to spin coating at 3000 rpm for 20 s. The resulting sample was heated at 140° C. for 30 minutes in a hot air circulation oven to yield a substrate provided with an antireflection film.

The average reflectance and the highest reflectance of the antireflection film were 0.04% and 0.14%, respectively. The contact angles of pure water and hexadecane on the surface of the antireflection film were 110° and 70°, respectively. The antireflection film had a portion having a higher fluororesin content at the surface. The portion has a thickness of 4 nm and the underlying porous layer had a thickness of 111 nm. The refractive index was distributed in the range of 1.245 to 1.250 from the surface. The atomic ratio of fluorine to silicon at the surface of the porous layer was 1.20, and the ratio of the fluorine concentration at the surface of the porous layer to the fluorine concentration at a depth of 25 nm from the surface was 6.8.

Example 7

Figure 11:
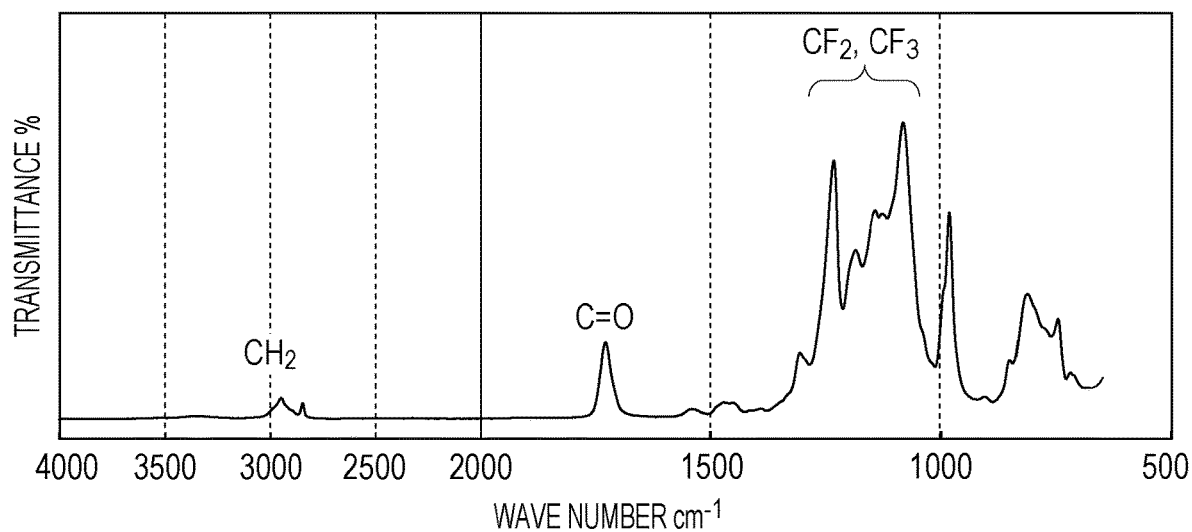
FIG. 11 is an infrared reflection spectrum of the fluororesin used in Example 7.

In Example 7, an appropriate amount of chainlike $SiO_2$ particle coating liquid 4 was dropped onto an oxide multilayer composite formed on a glass substrate (nd=1.52, vd=64.1) of 30 mm in diameter and 1 mm in thickness and was subjected to spin coating at 3200 rpm for 20 s. Table 1 shows the thicknesses and the refractive indices of the layers defining the oxide multilayer composite. Then, a solution of a fluororesin having a fluorocarbon group and exhibiting the infrared reflection spectrum shown in FIG. 11, Novec™ 2702 (produced by 3M, solids content: 2% by mass), was diluted 20 times with a fluorine-based solvent Novec™ 7300 (produced by 3M). An appropriate amount of the diluted solution was dropped onto the surface of the porous layer of chainlike $SiO_2$ particles formed on the multilayer composite and was subjected to spin coating at 3000 rpm for 20 s. The resulting sample was heated at 140° C. for 30 minutes in a hot air circulation oven to yield a substrate provided with an antireflection film.

The average reflectance and the highest reflectance of the antireflection film were 0.03% and 0.13%, respectively. The contact angles of pure water and hexadecane on the surface of the antireflection film were 114° and 63°, respectively. The antireflection film had a portion having a higher fluororesin content at the surface. The portion has a thickness of 4 nm and the underlying porous layer had a thickness of 110 nm. The refractive index was distributed in the range of 1.240 to 1.245 from the surface. The atomic ratio of fluorine to silicon at the surface of the porous layer was 1.37, and the ratio of the fluorine concentration at the surface of the porous layer to the fluorine concentration at a depth of 25 nm from the surface was 8.1.

Figure 12:
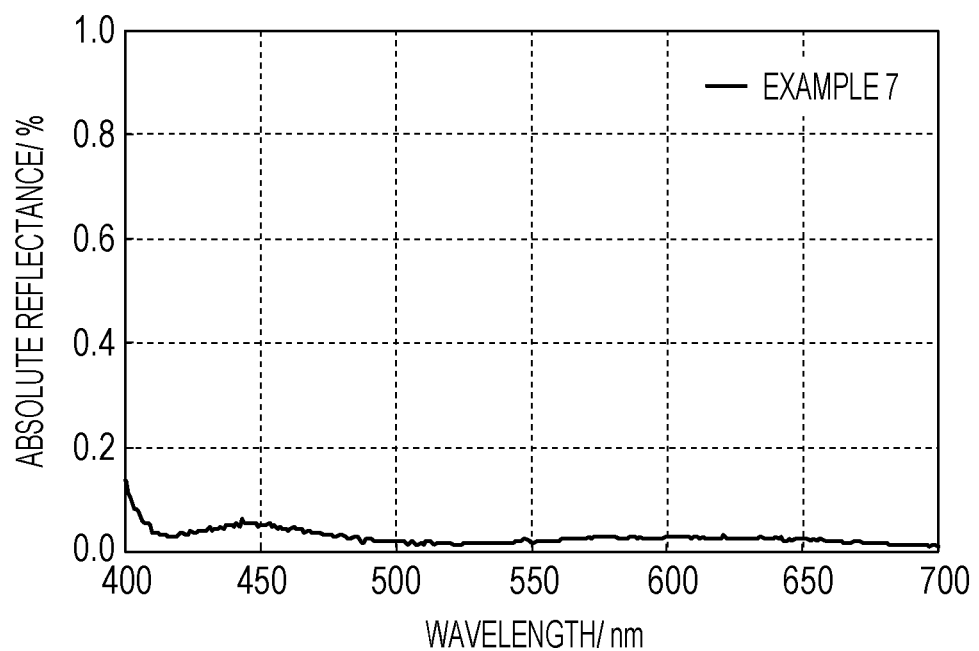
FIG. 12 is a plot of absolute reflectance at the surface of the antireflection film of Example 7.
Figure 13:
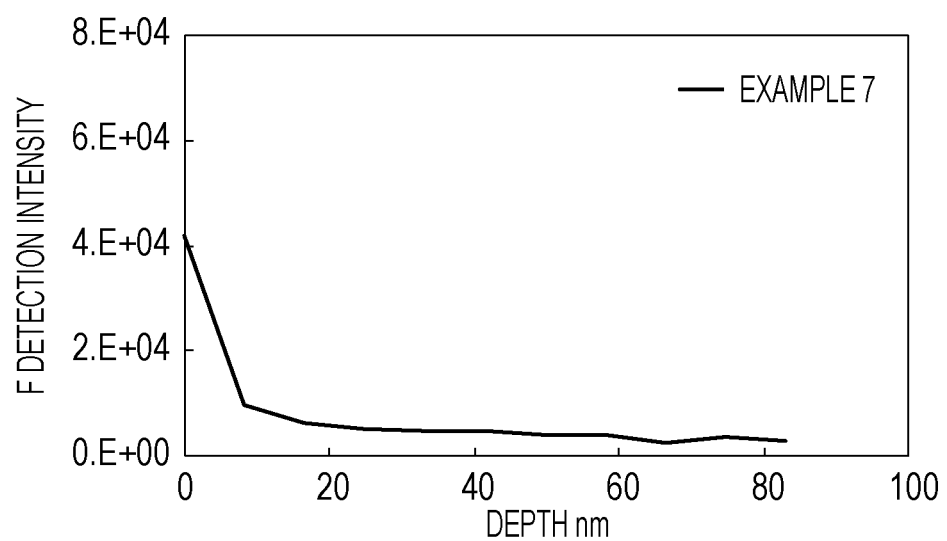
FIG. 13 is a plot of the changes with depth in fluorine content in the porous layer of Example 7.

The absolute reflectance is shown in FIG. 12, and the fluorine concentration in the depth direction of the porous layer is shown in FIG. 13.

Example 8

Figure 14:
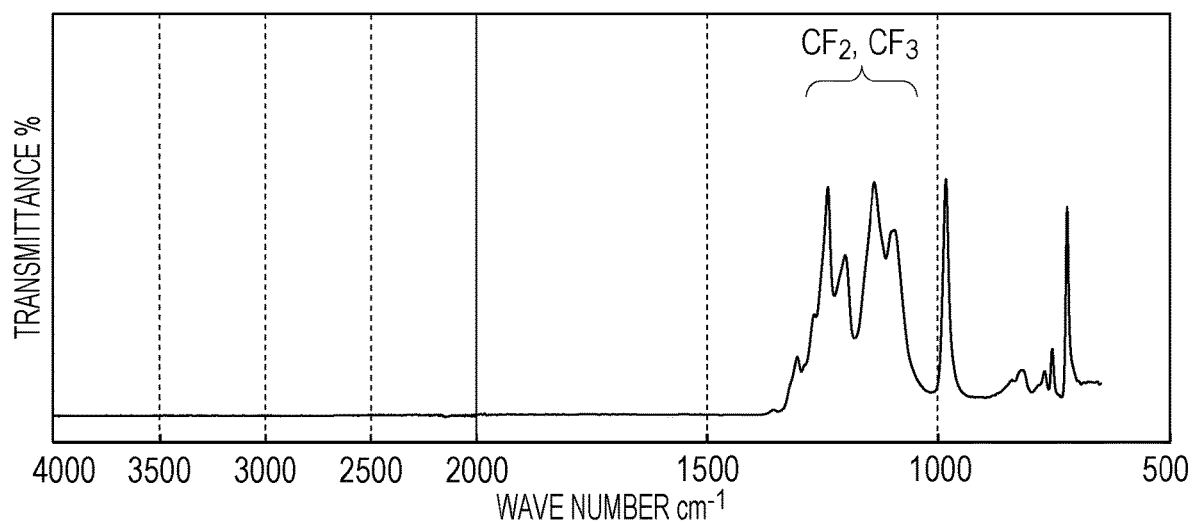
FIG. 14 is an infrared reflection spectrum of the fluororesin used in Example 8.

In Example 8, a porous layer of chainlike $SiO_2$ particles was formed on a multilayer composite having the same structure as in Example 1 in the same manner as in Example 7. Then, an appropriate amount of a solution (solids content: 0.15% by mass) of an amorphous tetrafluoroethylene copolymer Teflon™ AF 1600 (produced by DuPont Mitsui Fluorochemical) shown in FIG. 14 in a fluorine-based solvent Vertrel™ Suprion (produced by DuPont Mitsui Fluorochemical) was dropped onto the surface of the porous layer of chainlike $SiO_2$ particles formed on the multilayer composite and was subjected to spin coating at 4000 rpm for 20 s. The resulting sample was heated at 140° C. for 30 minutes in a hot air circulation oven to yield a substrate provided with an antireflection film.

The average reflectance and the highest reflectance of the antireflection film were 0.04% and 0.15%, respectively. The contact angles of pure water and hexadecane on the surface of the antireflection film were 108° and 62°, respectively. The antireflection film had a portion having a higher fluororesin content at the surface. The portion has a thickness of 6 nm and the underlying porous layer had a thickness of 110 nm. The refractive index was distributed in the range of 1.241 to 1.246 from the surface. The atomic ratio of fluorine to silicon at the surface of the porous layer was 2.51, and the ratio of the fluorine concentration at the surface of the porous layer to the fluorine concentration at a depth of 25 nm from the surface was 5.9.

Figure 15:
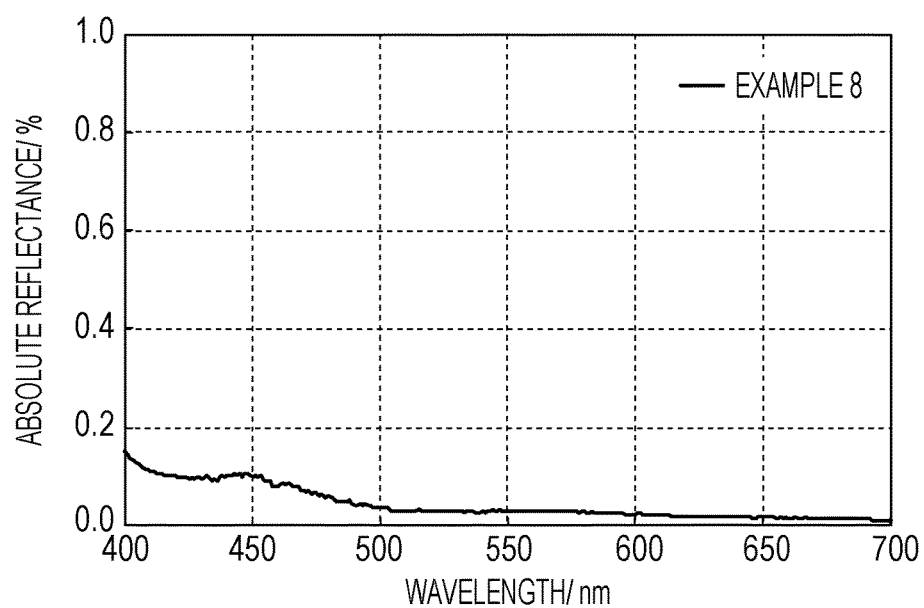
FIG. 15 is a plot of absolute reflectance at the surface of the antireflection film of Example 8.
Figure 16:
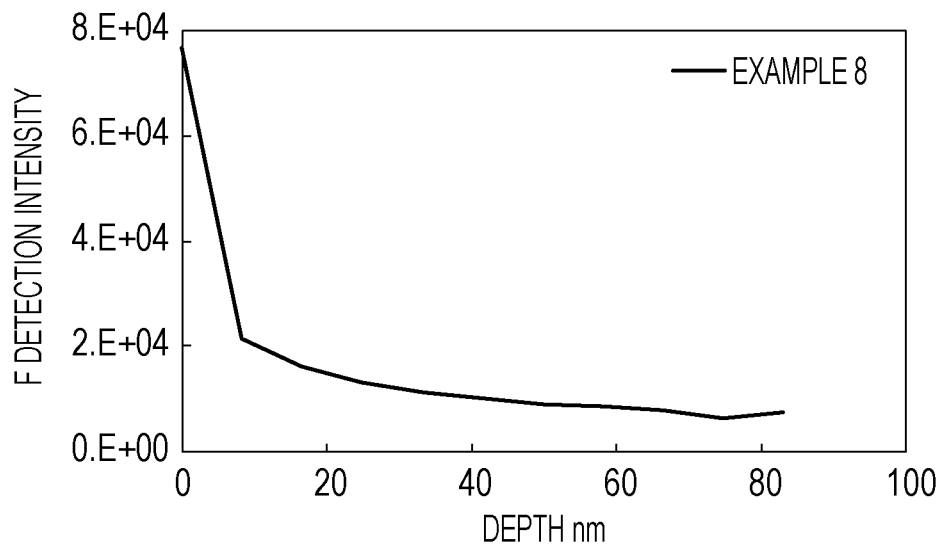
FIG. 16 is a plot of the changes with depth in fluorine content in the porous layer of Example 8.

The absolute reflectance is shown in FIG. 15, and the fluorine concentration in the depth direction of the porous layer is shown in FIG. 16.

Comparative Example 1

In Comparative Example 1, a porous layer of chainlike $SiO_2$ particles was formed on a multilayer composite having the same structure as in Example 1 in the same manner as in Example 1.

Figure 17:
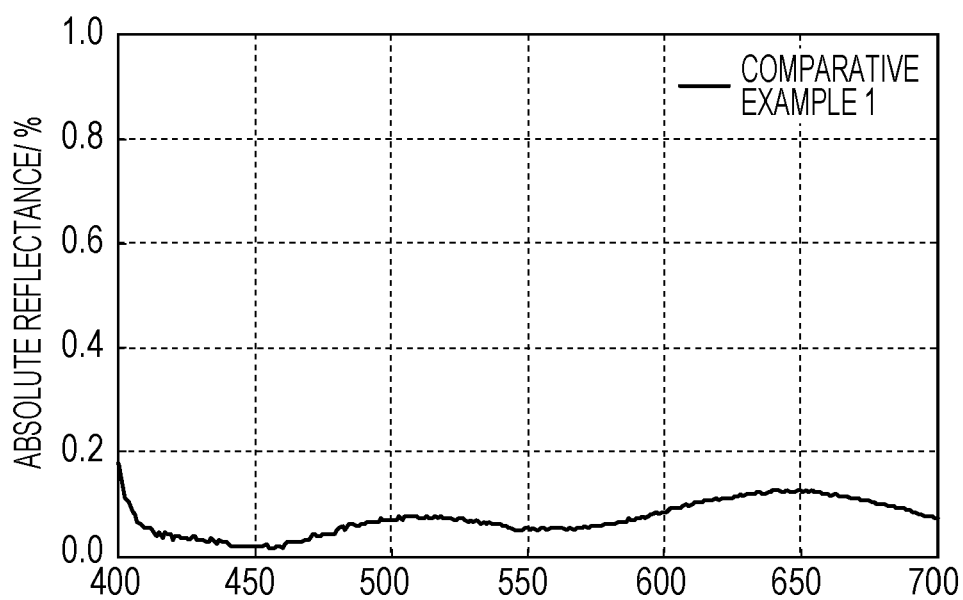
FIG. 17 is a plot of absolute reflectance at the surface of the antireflection film of Comparative Example 1.
Figure 18:
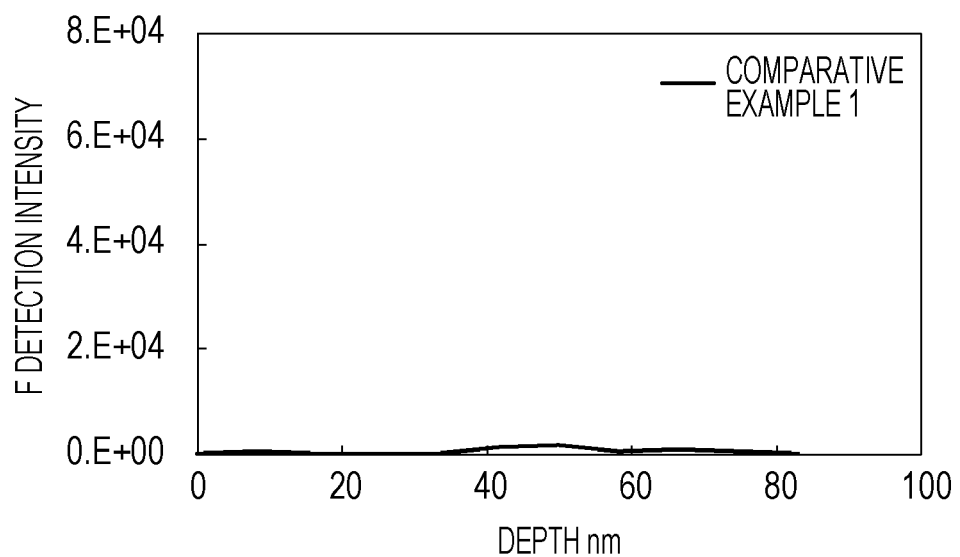
FIG. 18 is a plot of the changes with depth in fluorine content in the porous layer of Comparative Example 1.

The average reflectance and the highest reflectance of the resulting antireflection film were 0.07% and 0.18%, respectively. The contact angles of pure water and hexadecane on the surface of the antireflection film were each 10° or less. The porous layer defining the surface layer had a thickness of 111 nm, and the refractive index thereof was 1.240 without being distributed. The atomic ratio of fluorine to silicon at the surface of the porous layer was over 100, and the ratio of the fluorine concentration at the surface of the porous layer to the fluorine concentration at a depth of 25 nm from the surface was less than 0.1. The absolute reflectance is shown in FIG. 17, and the fluorine concentration in the depth direction of the porous layer is shown in FIG. 18.

Comparative Example 2

In Comparative Example 2, a porous layer of chainlike $SiO_2$ particles was formed on a multilayer composite having the same structure as in Example 1 in the same manner as in Example 2.

Figure 19:
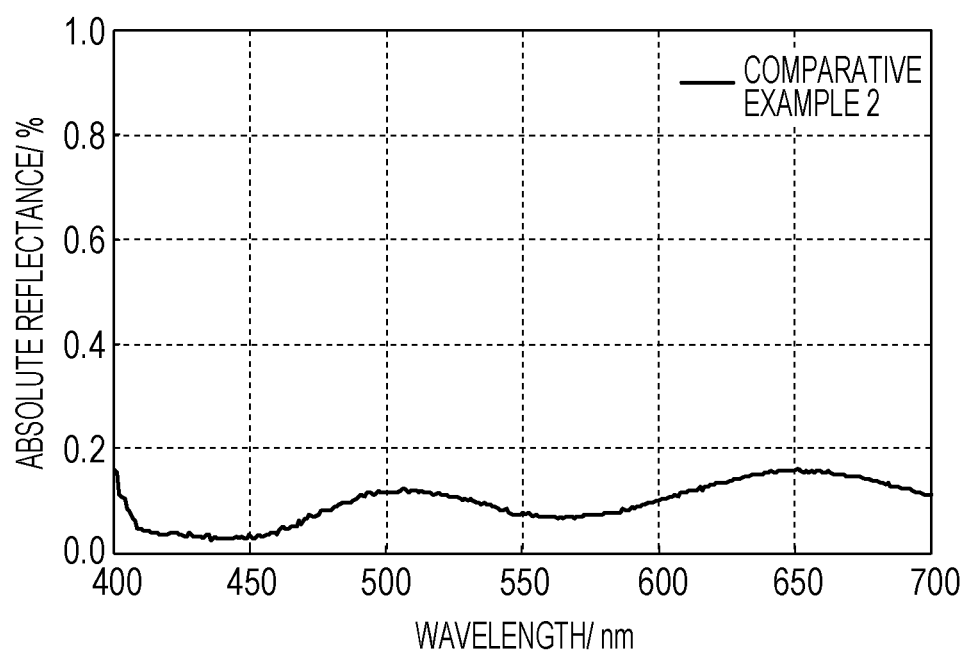
FIG. 19 is a plot of absolute reflectance at the surface of the antireflection film of Comparative Example 2.

The average reflectance and the highest reflectance of the resulting antireflection film were 0.10% and 0.16%, respectively. The contact angles of pure water and hexadecane on the surface of the antireflection film were each 10° or less. The porous layer defining the surface layer had a thickness of 106 nm, and the refractive index thereof was 1.239 without being distributed. The atomic ratio of fluorine to silicon at the surface of the porous layer was over 100, and the ratio of the fluorine concentration at the surface of the porous layer to the fluorine concentration at a depth of 25 nm from the surface was less than 0.1. The absolute reflectance is shown in FIG. 19.

Comparative Example 3

In Comparative Example 3, a porous layer of chainlike $SiO_2$ particles was formed on a multilayer composite having the same structure as in Example 1 in the same manner as in Example 1. Then, an appropriate amount of a silane coupling agent having a fluorocarbon group, Durasurf DS-5201 S135 (produced by Harves, solids content: 0.10% by mass), was dropped onto the surface of the porous layer of chainlike $SiO_2$ particles formed on the multilayer composite and was subjected to spin coating at 3000 rpm for 20 s. The resulting sample was heated at 140° C. for 30 minutes in a hot air circulation oven to yield a substrate provided with an antireflection film.

The average reflectance and the highest reflectance of the antireflection film were 0.08% and 0.18%, respectively. The contact angles of pure water and hexadecane on the surface of the antireflection film were 105° and 46°, respectively. The antireflection film had a portion having a higher fluororesin content at the surface. The portion has a thickness of 12 nm and the underlying porous layer had a thickness of 100 nm. The refractive index was 1.261 without being distributed. The atomic ratio of fluorine to silicon at the surface of the porous layer was 0.45, and the ratio of the fluorine concentration at the surface of the porous layer to the fluorine concentration at a depth of 25 nm from the surface was 3.7. Thus, the portion having a higher fluororesin content is not considered to be sufficient to reduce the reflectance and exhibit oil repellency.

Figure 20:
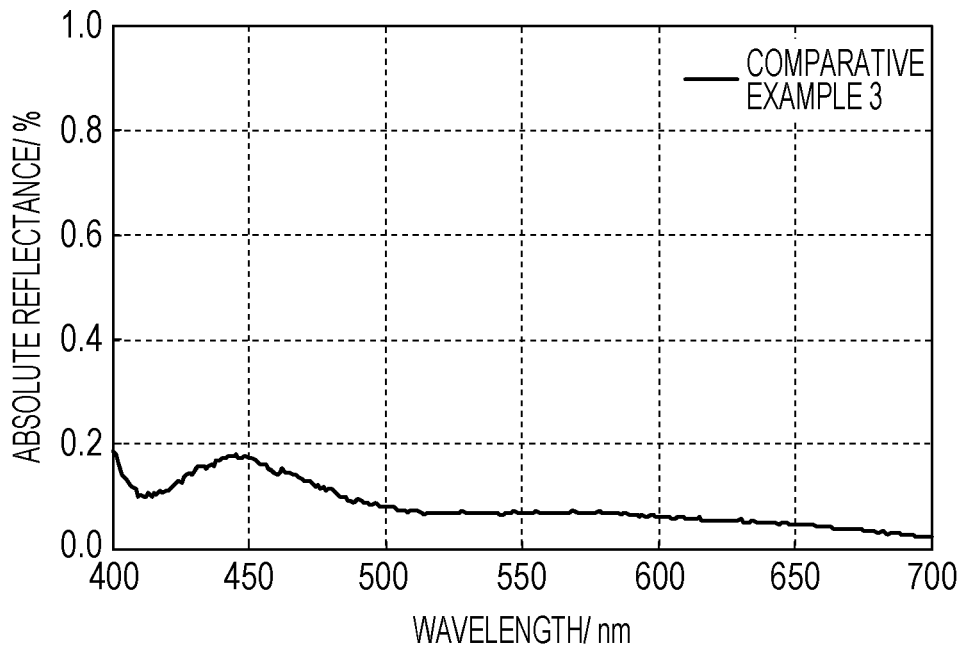
FIG. 20 is a plot of absolute reflectance at the surface of the antireflection film of Comparative Example 3.
Figure 21:
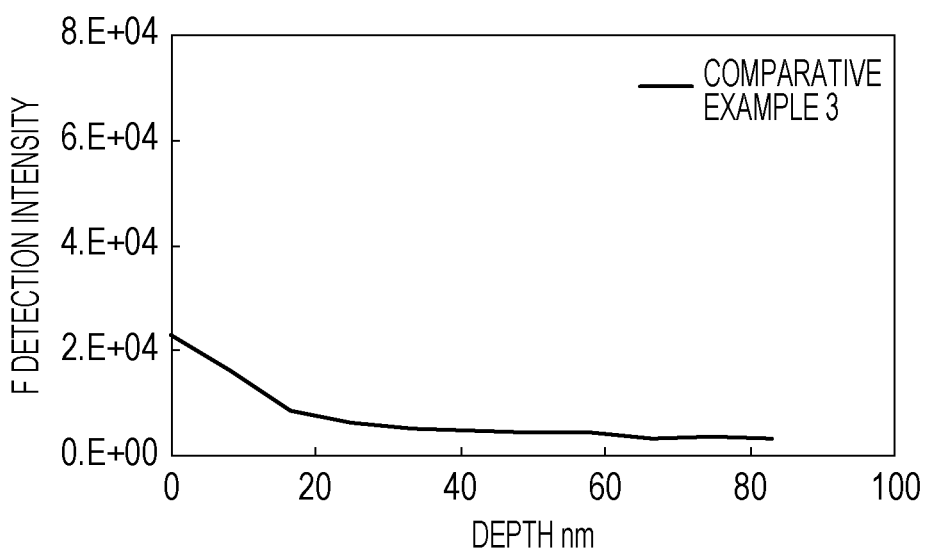
FIG. 21 is a plot of the changes with depth in fluorine content in the porous layer of Comparative Example 3.

The absolute reflectance is shown in FIG. 20, and the fluorine concentration in the depth direction of the porous layer is shown in FIG. 21.

Comparative Example 4

In Comparative Example 4, an appropriate amount of mixed $SiO_2$ particle coating liquid 5 was dropped onto an oxide multilayer composite formed on a glass substrate (nd=1.52, vd=64.1) of 30 mm in diameter and 1 mm in thickness and was subjected to spin coating at 3500 rpm for 20 s. Table 1 shows the thicknesses and the refractive indices of the layers defining the oxide multilayer composite. Furthermore, the same fluororesin solution as in Example 1 was applied by spin coating onto the surface of the resulting porous layer of mixed $SiO_2$ particles formed on the multilayer composite in the same manner as in Example 1, and the resulting sample was heated to yield a substrate provided with an antireflection film.

The average reflectance and the highest reflectance of the antireflection film were 0.21% and 0.30%, respectively. The contact angles of pure water and hexadecane on the surface of the antireflection film were 109° and 66°, respectively. The antireflection film had a portion having a higher fluororesin content at the surface. The portion has a thickness of 6 nm and the porous layer had a thickness of 106 nm. The refractive index was 1.302 without being distributed. The atomic ratio of fluorine to silicon at the surface of the porous layer was 3.1, and the ratio of the fluorine concentration at the surface of the porous layer to the fluorine concentration at a depth of 25 nm from the surface was 23.2. Since the content of chainlike $SiO_2$ particles in the porous layer is low, fluorine was concentrated at the surface. Consequently, the reflectance was not reduced effectively.

Figure 22:
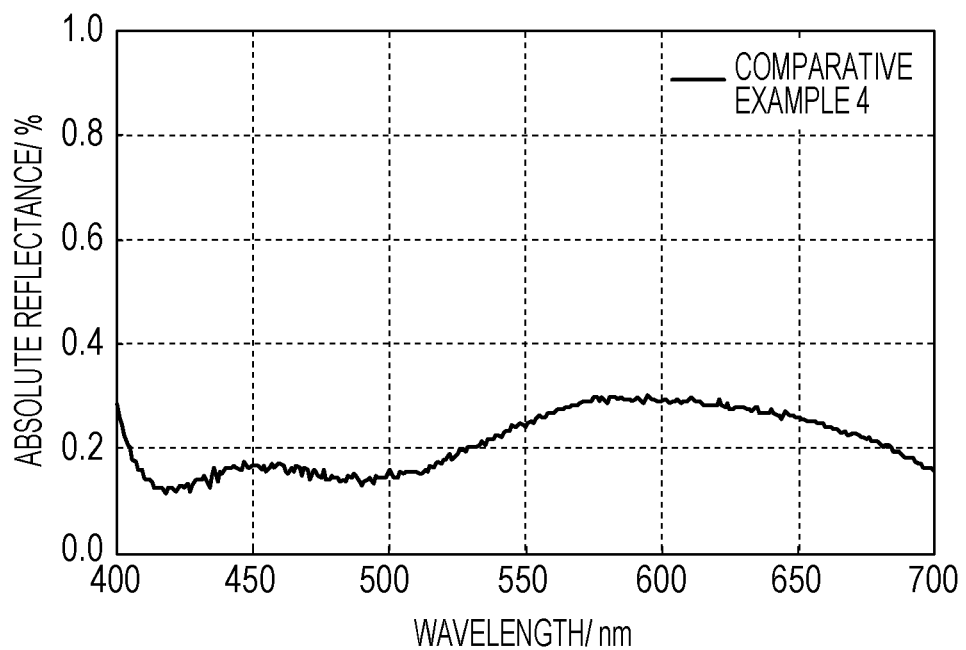
FIG. 22 is a plot of absolute reflectance at the surface of the antireflection film of Comparative Example 4.
Figure 23:
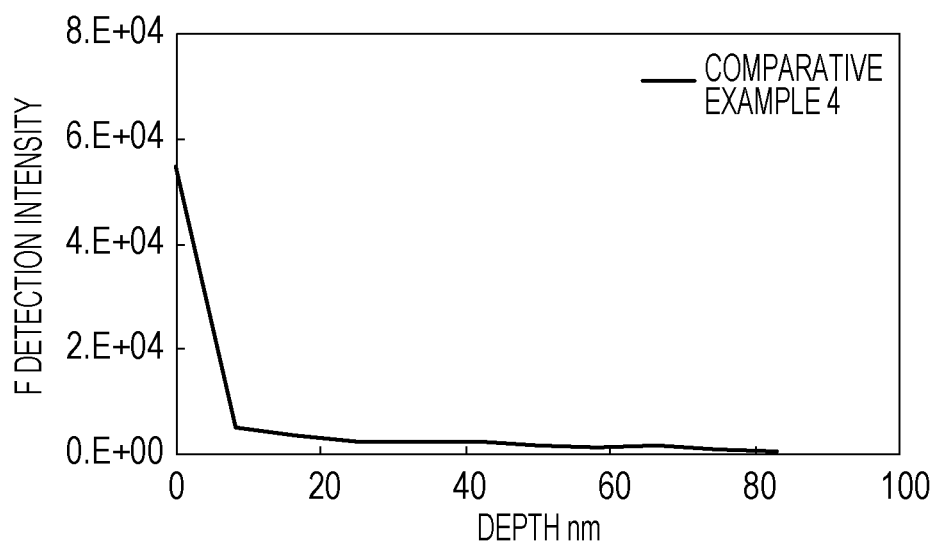
FIG. 23 is a plot of the changes with depth in fluorine content in the porous layer of Comparative Example 4.

The absolute reflectance is shown in FIG. 22, and the fluorine concentration in the depth direction of the porous layer is shown in FIG. 23.

TABLE 1

| Film structure | Refractive index λ: 550 nm | Thickness nm |
|---|---|---|
| 9th layer | 1.47 | 20.1 |
| 8th layer | 2.20 | 22.4 |
| 7th layer | 1.66 | 79.9 |
| 6th layer | 2.20 | 270.1 |
| 5th layer | 1.66 | 31.7 |
| 4th layer | 2.20 | 20.4 |
| 3rd layer | 1.66 | 10.0 |
| 2nd layer | 2.20 | 14.9 |
| 1st layer | 1.66 | 118.7 |
| Substrate | 1.52 | — |

TABLE 2

| | SiO₂ particle coating liquid | | Fluororesin solution | | Reflectance (%) (λ: 400-700 nm) | | Layer having higher fluorine concentration | | | Porous layer | | Contact angle (degree) | |
|---|---|---|---|---|---|---|---|---|---|---|---|---|---|
| | Coating liquid | Spin coating (rpm) | Fluororesin | Application | Average | Highest | Thickness nm | Fluorine/silicon atomic ratio | Fluorine concentration ratio | Thickness nm | Refractive index λ: 550 nm | Pure water | Hexadecane |
| Example 1 | Chainlike SiO₂ particle coating liquid 3 | 3200 | Durasurf DS-1101S135 | Spin coating | A0.02 | A0.10 | 4 | 1.83 | 7.4 | 111 | 1.245-1.250 | A112 | A68 |
| Example 2 | Chainlike SiO₂ particle coating liquid 3 | 3500 | Durasurf DS-1101S135 | Spin coating | A0.03 | A0.11 | 4 | 1.79 | 7.1 | 107 | 1.244-1.249 | A111 | A68 |
| Example 3 | Chainlike SiO₂ particle coating liquid 3 | 3200 | Durasurf DS-1101TH | Spin coating | A0.03 | A0.10 | 3 | 1.80 | 6.5 | 115 | 1.245-1.250 | A112 | A67 |
| Example 4 | Chainlike SiO₂ particle coating liquid 3 | 3200 | Durasurf DS-1101TH | Spray coating | A0.02 | A0.11 | 4 | 1.88 | 5.4 | 110 | 1.245-1.250 | A112 | A68 |
| Example 5 | Chainlike SiO₂ particle coating liquid 3 | 3200 | Durasurf DS-16005CH | Spin coating | A0.04 | A0.13 | 6 | 1.13 | 8.0 | 110 | 1.245-1.250 | A113 | A73 |
| Example 6 | Chainlike SiO₂ particle coating liquid 3 | 3200 | SFCOAT SNF-B200A | Spin coating | A0.04 | A0.14 | 4 | 1.20 | 6.8 | 111 | 1.245-1.250 | A110 | A70 |
| Example 7 | Chainlike SiO₂ particle coating liquid 4 | 3200 | Novec™ 2702 | Spin coating | A0.03 | A0.13 | 4 | 1.37 | 8.1 | 110 | 1.240-1.245 | A112 | A67 |
| Example 8 | Chainlike SiO₂ particle coating liquid 4 | 3200 | Teflon™ 1600 | Spin coating | A0.04 | A0.15 | 6 | 2.51 | 5.9 | 110 | 1.241-1.246 | A108 | A62 |
| Comparative Example 1 | Chainlike SiO₂ particle coating liquid 3 | 3200 | — | — | B0.07 | B0.18 | — | >100 | <0.1 | 111 | 1.240 | C < 10 | C < 10 |

TABLE 2-continued

| | SiO₂ particle coating liquid | | Fluororesin solution | | Reflectance (%) (λ: 400-700 nm) | | Layer having higher fluorine concentration | | Porous layer | | Contact angle (degree) | |
| | | Spin coating (rpm) | | | | | Thick- | Fluorine/ silicon | Fluorine concen- | Thick- | Refractive | | |
| | Coating liquid | | Fluororesin | Appli- cation | Average | Highest | ness nm | atomic ratio | tration ratio | ness nm | index λ: 550 nm | Pure water | Hexa- decane |
|---|---|---|---|---|---|---|---|---|---|---|---|---|---|
| Comparative Example 2 | Chainlike SiO₂ particle coating liquid 3 | 3500 | — | — | B0.10 | B0.16 | — | >100 | <0.1 | 106 | 1.239 | C < 10 | C < 10 |
| Comparative Example 3 | Chainlike SiO₂ particle coating liquid 3 | 3200 | Durasurf DS-5201S135 | Spin coating | B0.08 | B0.18 | 12 | 0.45 | 3.7 | 100 | 1.261 | B105 | C46 |
| Comparative Example 4 | Mixed SiO₂ particle coating liquid 5 | 3500 | Durasurf DS-1101S135 | Spin coating | C0.21 | C0.30 | 6 | 3.1 | 23.2 | 106 | 1.302 | B109 | A66 |

Evaluation of Examples and Comparative Examples

The optical members of Examples 1 to 4 exhibited average reflectances of 0.05 or less, thus exhibited satisfactory antireflection effect. Also, the contact angles of pure water and hexadecane were 110° or more and 60° or more, respectively, and thus these Examples exhibited a high antifouling property. On the other hand, the optical members of Comparative Examples 1 and 2, which were not provided with fluororesin on the surface thereof, were inferior in antireflection effect to Examples 1 to 4, and the contact angles of pure water and hexadecane were as low as less than 10°.

The optical member according to the first embodiment can be used in, for example, imaging apparatuses, such as cameras and video cameras, and optical scanning apparatuses, such as liquid crystal projectors and electrophotographic apparatuses.

The optical member of the first embodiment has good optical properties and antifouling property.

Second Embodiment

A second embodiment of the present disclosure will now be described in detail.

Optical Member

Figure 24:
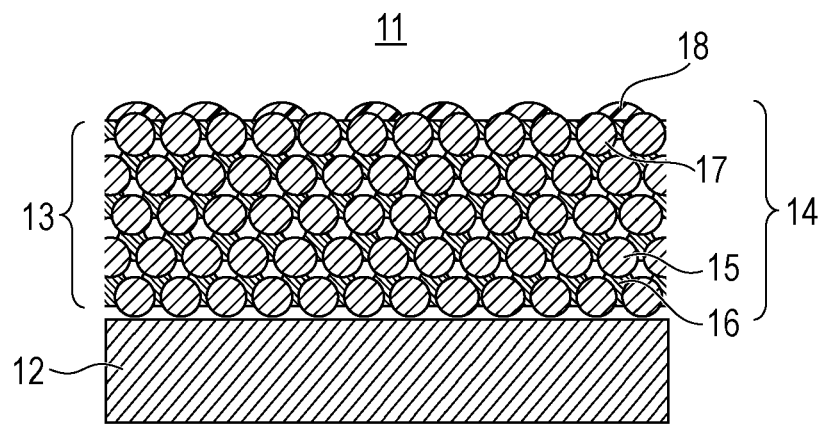
FIG. 24 is a schematic view of an optical member according to a second embodiment of the present disclosure.

FIG. 24 is a schematic view of an optical member according to an embodiment of the present disclosure.

The optical member 11 of the second embodiment includes a substrate 12, and an antireflection film 14 having a porous layer 13 on the substrate 12. The porous layer 13 contains silicon oxide particles 15 and a binder 16.

In the porous layer 13, as shown in FIG. 24, the silicon oxide particles 15 are bound to each other with the binder 16. The surfaces of at least part of the silicon oxide particles in the vicinity of the surface of the porous layer 13 are alkylsilylated, and the surface of the porous layer 13 is defined by alkylsilylated silicon oxide particles 17. The porous layer 13 is provided with a fluororesin 18 thereon.

In the porous layer 13, the silicon oxide particles 15 may be in contact with each other or may be indirectly bound to each other with the binder therebetween. Advantageously, the silicon oxide particles 15 are in contact with each other from the viewpoint of enhancing wear resistance of the porous layer 13.

Figure 25:
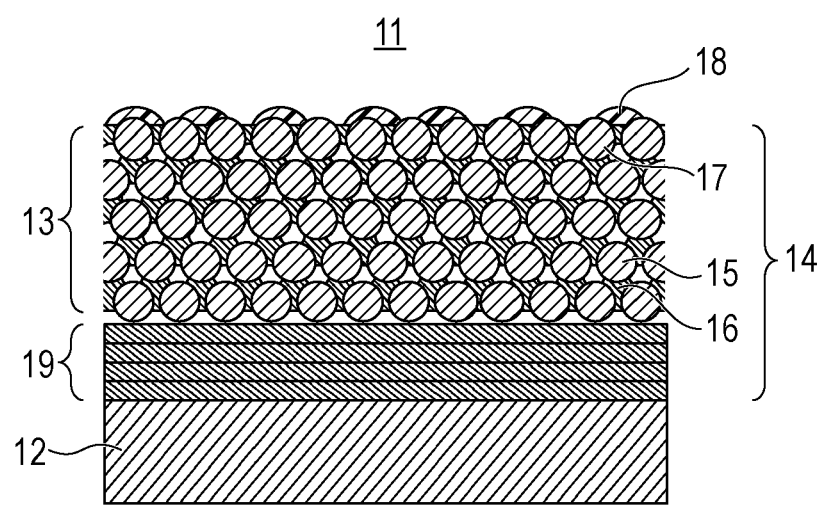
FIG. 25 is a schematic view of a modification of the optical member according to the second embodiment of the present disclosure.

FIG. 25 is a schematic view of a modification of the optical member 11 according to the present embodiment. In the structure shown in FIG. 25, the antireflection film 14 further includes an oxide layer 19 disposed between the substrate 12 and the porous layer 13. Advantageously, the oxide layer 19 has a multilayer structure including a high refractive index layer and a low refractive index layer. The high refractive index layer may contain zirconium oxide, titanium oxide, tantalum oxide, niobium oxide, or hafnium oxide. The low refractive index layer may contain silicon oxide or magnesium fluoride.

The optical member of the second embodiment may be used for optical lenses, optical mirrors, filters, or optical films. The optical member is particularly suitable for optical lenses.

Substrate

The substrate 12 may be made of glass or a resin. Also, the substrate 12 has any shape without particular limitation and may have a flat, curved, or recessed surface or may be in the form of a film.

Silicon Oxide Particles

Desirably, the average particle size of the silicon oxide particles 15 is in the range of 10 nm to 80 nm, more desirably in the range of 12 nm to 60 nm. If the average particle size of the silicon oxide particles 15 is less than 10 nm, the pores among the particles and in the particles can be so small that the refractive index cannot be reduced. In contrast, if the average particle size exceeds 80 nm, large pores are formed among the particles, and accordingly, a large void is likely to be formed. In addition, such large particles disadvantageously cause scattering.

The average particle size of silicon oxide particles mentioned herein refers to an average Feret diameter. The average Feret diameter can be determined by image processing of transmission electron micrographs. For the image processing, a commercially available image processing apparatus, such as image Pro PLUS (manufactured by Media Cybernetics), may be used. More specifically, Feret diameters of particles in a specific image region, whose contrast may be adjusted if necessary, are measured and averaged.

The silicon oxide particles 15 may be in the shape of circle, oval, disk, bar, needle, chain, or square and may be hollow particles having holes inside.

Advantageously, the percentage of hollow or chain silicon oxide particles account for 50% by mass or more, desirably 80% by mass or more, of the silicon oxide particles 15. The refractive index of the porous layer 13 can be reduced by increasing the porosity.

A hollow silicon oxide particle used herein refers to a particle having a hole defined by a shell of silicon oxide. The presence of air (having a refractive index of 1.0) in the hole reduces the refractive index of the porous layer 13 to be lower than the refractive index in the case of silicon oxide particles not having holes. The number of holes may be one or more and may be determined as needed. The thickness of the shell defining the hole of the hollow particle may be in the range of 10% to 50%, desirably in the range of 20% to 35%, of the average particle size. If the thickness is less than 10%, the strength of the particles is insufficient. In contrast, if the thickness of the shell exceeds 50%, the refractive index is not reduced effectively.

A chainlike particle is a chain or string formed of a plurality of particles. Chainlike silicon oxide particles maintain the form of a chain or string even after being formed into a film. Therefore, the use of chainlike silicon oxide particles can increase the porosity compared to the case of using discrete particles. In addition, particles forming a chain can each be small and are not likely to form a void. The number of particles forming a chainlike particle is in the range of 2 to 10 and is advantageously in the range of 3 to 6. If the number of particles forming a chain exceeds 10, a void is likely to be formed, and accordingly the wear resistance of the layer is degraded. The particle size of particles having a minor and a major axis like chainlike particles is defined by the minor axis.

The silicon oxide particles 15 mainly contain $SiO_2$, and the Si accounts for desirably 80 atomic percent or more, more desirably 90 atomic percent or more, of all the elements in the chainlike silicon oxide particles except oxygen. If the Si content is less than 80 atomic percent, silanol (Si—OH) groups at the surfaces of the particles, which will react with the binder 16 are reduced, and consequently, the wear resistance of the resulting layer is degraded.

In addition to $SiO_2$, another metal oxide such as $Al_2O_3$, $TiO_2$, $ZnO_2$, or $ZrO_2$, or an organic component such as an alkyl group or an alkyl fluoride group may be introduced into the silicon oxide particles 15 or to the surfaces of the silicon oxide particles. In view of the reactivity between the particles and the binder and the maintenance of low refractive index, it is advantageous to use hydrophilic particles whose silanol groups on the surfaces thereof remain 70% or more. More advantageously, silanol groups remains 90% or more on the surfaces of the particles. If the silanol groups on the surfaces of the particles are reduced to less than 70% by surface modification with organic groups, the hydrophilicity of the particles is lost. Consequently, the interaction and reactivity between the particles and the binder are reduced, and accordingly, the strength of the resulting layer is reduced. In the present embodiment, while the silicon oxide particles in the vicinity of the surface of the porous layer 13 are modified into alkylsilylated silicon oxide particles 17, the hydrophilicity of the other silicon oxide particles 15 is maintained. Thus, the strength of the resulting layer is unlikely to decrease.

Alkylsilylation

The alkylsilyl groups that can be introduced include —$SiR_3$, =$SiR_2$, and ≡SiR, wherein R represents a monovalent organic group. Since smaller organic groups exhibit a lower steric hindrance therebetween and reduce the in-plane variation in water repellency and refractive index, it is advantageous that the silicon oxide particles be alkylsilylated by an alkylsilyl group represented by the following formula (2): Alternatively, the particles may be alkylsilylated by an alkylsilyl group represented by the following formula (3), which can be substituted for two silanol groups so as to form a linkage and can impart a high repellency.

(2)

In formula (2), R1 represents a hydrogen atom or a monovalent organic group selected from the group consisting of linear or branched alkyl groups having a carbon number of 1 to 8, alkenyl groups, and fluorinated alkyl groups.

(3)

In formula (3), R2 represents a monovalent organic group selected from the group consisting of linear or branched alkyl group having a carbon number of 1 to 8, alkenyl groups, and fluorinated alkyl groups.

Alkylsilyl groups may be used singly or in combination.

The content of the silicon oxide particles 15 in the porous layer 3 is desirably in the range of 50% by mass to 95% by mass, such as in the range of 65% by mass to 85% by mass.

Binder

The binder 16 may be selected according to the wear resistance, adhesion and environmental reliability of the antireflection film. Silicon oxide binders are advantageous because they have affinity with the silicon oxide particles 15 and can increase the wear resistance of the porous layer 13. A hydrolysis-condensation product of silicate is particularly advantageous among the silicon oxide binders.

Desirably, the silicon oxide binder has a polystyrene-equivalent weight average molecular weight in the range of 500 to 3000. If the weight average molecular weight is less than 500, the cured porous layer tends to be cracked, or the stability of the binder solution or liquid to be applied is degraded. In contrast, if the weight average molecular weight exceeds 3000, the viscosity of the binder is increased. Consequently, nonuniform voids are likely to be formed in the binder phase and, accordingly, large voids are likely to be formed.

The content of the binder 16 in the porous layer 13 is desirably in the range of 5% by mass to 40% by mass, such as in the range of 10% by mass to 30% by mass.

Advantageously, the silicon oxide binder is represented by the following composition formula (4):

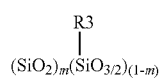

$$(SiO_2)_m(SiO_{3/2})_{(1-m)} \quad (4)$$

In formula (4), R3 represents a group selected from the group consisting of alkyl having a carbon number of 1 to 8, alkenyl, alkynyl, and aromatic rings, and these groups may have a substituent of an amino, an isocyanate, a mercapto, or an acryloyl group or a halogen atom. m satisfies $0.90 \leq m \leq 0.99$.

If m in formula (4) is less than 0.9, the hydrophilicity of the binder 6 is reduced. Consequently, the interaction between the binder 6 and the silicon oxide particles 5 is weakened, and the wear resistance of the porous layer 13 is degraded. Desirably, $0.95 \leq m \leq 0.99$ holds true.

The surface of the binder 16 bound to the alkylsilylated silicon oxide particles 17 may be alkylsilylated. If a silicon oxide binder is used, it is advantageous that the binder phase contains silanol groups. The silanol groups in the binder 16 form hydrogen bonds, thus increasing the wear resistance of the porous layer 13.

Fluororesin

Examples of the fluororesin 18 include perfluoropolyether, polytetrafluoroethylene (PTFE), poly(vinylidene fluoride) (PVDF), perfluoroalkoxy resin (PFA), and copolymers of tetrafluoroethylene and hexafluoropropylene. Polymers such as acrylic resin and vinyl resin, having a fluorocarbon group, such as a fluoroalkyl group or a fluoroalkenyl group, as a pendant group may be used as the fluororesin. It is difficult to form a very thin uniform oil-repellent layer on an uneven or porous surface like the surface of the porous layer 3. Fluororesin can exhibit oil repellency even though it is not in the form of an even layer.

Porous Layer

The porous layer 13 may have a thickness in the range of 80 nm to 200 nm, desirably in the range of 100 nm to 160 nm. A porous layer of less than 80 nm in thickness is unlikely to exhibit good wear resistance, and a porous layer of larger than 200 nm in thickness is unlikely to have a reduced reflectance.

The porosity of the porous layer 13 is desirably in the range of 30% to 50%. A porous layer having a porosity of less than 30% exhibits a high refractive index and may not produce an antireflection effect, and a porous layer having a porosity of higher than 50% is inferior in wear resistance because of the presence of excessively large pores.

The refractive index of the porous layer 13 is desirably in the range of 1.19 to 1.35, such as in the range of 1.22 to 1.32.

The silicon oxide particles in the vicinity of the surface of the porous layer 13 are modified into alkylsilylated silicon oxide particles 17 by substitution of alkylsilyl groups for the hydrogen atoms of the silanol groups on the surfaces of the silicon oxide particles. Such a porous layer is provided with a fluororesin 18 thereon. If oil or the like is attached to a porous layer 13 not provided with the fluororesin 18, the oil or the like is likely to penetrate and diffuse into the pores among the silicon oxide particles. The same applied to the oil component in dust or the like. The oil component in dust attached to the porous layer, even though it is not visible, can penetrate and diffuse into the pores among the silicon oxide particles after a time has passed. In this instance, the refractive index of the portion to which the oil component has diffused is varied, and thus a visible defect appears in the resulting optical member. In the porous layer 13 provided with a fluororesin 18, however, the oil repellency of the fluororesin 18 prevents oil or any other dirt from penetrating and diffusing.

Since it is difficult to form a very thin uniform fluorocarbon film on the porous layer 13, as described above, the fluororesin 18 is applied in an island manner or a dotted matter, or in the form of an uneven layer including thick portions and thin portions. The fluororesin 18, even though it is not uniformly attached to the porous layer 13, can prevent oil from penetrating and diffusing into the porous layer 13 because of the viscosity of the oil. However, if it is attempted to remove the oil with a solvent, the oil is dissolved in the solvent and the viscosity of the oil component is reduced. The oil component having a reduced viscosity is likely to reach the porous layer 13 through the gaps in the coating of the fluororesin 18.

The porous layer 13 is easily contaminated with organic substances due to the high activity of silanol groups unless the silicon oxide particles in the vicinity of the surface of the porous layer 13 are alkylsilylated. Therefore, the oil component dissolved in a solvent that has reached the porous layer 13 through the gaps in the coating of the fluororesin 18 penetrates and diffuses deeply into the porous layer 13. Then, the solvent is removed by volatilization, and thus the remaining oil component turns visible. This is a cause of defects in terms of optical properties and appearance. If the silicon oxide particles in the vicinity of the surface of the porous layer 13 are modified into alkylsilylated silicon oxide particles 17, the surface of the porous layer 13 hardly has silanol groups that help the penetration and diffusion of oil. Therefore, even if an oil component dissolved in a solvent has passed through the gaps in the coating of the fluororesin 8, the oil component is unlikely to penetrate and diffuse into the porous layer 13. Therefore, dirt on the porous layer 13 and a trace thereof are allowed to be completely removed with, for example, nonwoven fabric soaked with a solvent such as alcohol. The silicon oxide particles in the vicinity of the surface of the porous layer 13 are modified into alkylsilylated silicon oxide particles 17, and the fluororesin 18 is attached to the alkylsilylated silicon oxide particles 17. This structure can prevent contamination with a silicone component volatilized from a caulking material or an adhesive.

Advantageously, the contact angle of hexadecane on the surface of the porous layer 13 is in the range of 50° to 80°, more advantageously in the range of 60° to 75°. The contact angle of hexadecane mentioned herein refers to the contact angle of 10 μL of hexadecane dropped on the surface of an antireflection film, measured by a half-angle method (θ/2 method). If the contact angle of hexadecane is less than 50°, oil is not sufficiently prevented from diffusing.

Advantageously, the contact angle of water with the surface of the porous layer 13 is in the range of 100° to 130°, more advantageously in the range of 110° to 120°.

The increment of the refractive index of the entire porous layer 13 increased by applying fluororesin is desirably in the range of 0.0075 to 0.02, such as in the range of 0.01 to 0.02. If the increment of the refractive index is less than 0.0075, the contact angle of hexadecane is undesirably reduced to less than 50°. If the increment of the refractive index exceeds 0.02, the surface of the porous layer 13 undesirably has a portion having a high refractive index.

The increment of the refractive index of the entire porous layer 13 increased by alkylsilylation is desirably in the range of 0.001 to 0.008, such as in the range of 0.002 to 0.005. If the increment of the refractive index increased by alkylsilylation is less than 0.001, the silicon oxide particles are not sufficiently modified into alkylsilylated silicon oxide particles 17, and accordingly a mark formed by wiping dirt off is likely to be left. If the increment of the refractive index exceeds 0.008, fluorine is unlikely to be attached to the surface of the porous layer 13, and accordingly, the contact angle of hexadecane is undesirably reduced to less than 50°.

Method for Manufacturing Optical Member

A method for manufacturing the optical member 11 according to the present embodiment includes forming the porous layer 13, in which the silicon oxide particles 15 are bound to each other with the binder 16, on the surface of a substrate 12 or the surface of a layer or a multilayer structure disposed on the substrate 12.

For forming the porous layer 13, a dry process or a wet process may be employed. The wet process allows the porous layer 13 to be easily formed and is thus advantageous.

In a wet process for forming the porous layer 13, for example, a dispersion liquid of the silicon oxide particles and a binder solution may be separately applied one after the other, or a dispersion liquid containing both the silicon oxide particles and the binder may be applied.

The dispersion liquid of the silicon oxide particles is prepared by dispersing the silicon oxide particles in a solvent. The silicon oxide content in this dispersion liquid is desirably in the range of 2% by mass to 10% by mass. The dispersion liquid of the silicon oxide particles 15 may further contain a silane coupling agent or a surfactant for increasing dispersibility. However, if such an additive reacts with the silanol groups at the surfaces of the silicon oxide particles 15, the binding force between the silicon oxide particles 15 and the binder 16 is reduced, and consequently, the wear resistance of the resulting porous layer 13 is reduced. Accordingly, the proportion of the additive such as a silane coupling agent or a surfactant is desirably 10 parts by mass or less, more desirably 5 parts by mass or less, relative to 100 parts by mass of the silicon oxide particles.

Advantageously, a silicon oxide binder solution is used as the binder solution. Silicon oxide binders have a strong binding force with the silicon oxide particles. Advantageously, the silicon oxide binder solution mainly contains a hydrolysis-condensation product of silicate. This solution may be prepared by adding water and an acid or a base to a silicate ester, such as methyl silicate or ethyl silicate, in a solvent for hydrolysis and condensation. The acid used for this reaction may be hydrochloric acid, nitric acid, or the like, and the base may be ammonia or an amine. These are selected in view of solubility in the solvent and reactivity with the silicate ester. Alternatively, the silicon oxide binder solution may be prepared by neutralizing a silicate such as sodium silicate in water for condensation and then diluting the condensate with a solvent. The acid used for the neutralization may be hydrochloric acid, nitric acid, or the like. The binder solution may be prepared while being heated to a temperature of 80° C. or less.

If a silicon oxide binder is used as the binder 16, a trifunctional silane alkoxide substituted by an organic group, such as methyltriethoxysilane or ethyltriethoxysilane, may be added for improving solubility and ease of application. The proportion of the trifunctional silane alkoxide is desirably 10% by mole or less to the total moles of silane alkoxides. If the amount of the trifunctional silane alkoxide added exceeds 10% by mole, the organic groups in the binder hinder the silanol groups from forming hydrogen bonds in the binder, and consequently, the wear resistance of the porous layer is degraded.

The silicon oxide content in the silicon oxide binder solution is desirably in the range of 0.2% by mass to 2% by mass.

If a dispersion liquid containing both the silicon oxide particles and the binder is used, the dispersion liquid may be prepared by mixing a dispersion liquid of the silicon oxide particles and a solution of the binder, or adding the material of the binder into a dispersion liquid of the silicon oxide particles. In the case of the latter process and using a silicon oxide binder as the binder 16, the dispersion liquid may be prepared through a reaction performed by adding ethyl silicate, water, and an acid catalyst into the dispersion liquid of silicon oxide particles. It is advantageous to prepare a binder solution in advance because the dispersion liquid can be prepared while the state of the reaction is being checked.

The proportion of the binder in the dispersion liquid containing both the silicon oxide particles and the silicon oxide binder is desirably in the range of 5 parts by mass to 35 parts by mass, such as 10 parts by mass to 20 parts by mass, relative to 100 parts by mass of the silicon oxide particles.

The solvents for the dispersion liquid of the silicon oxide particles and the silicon oxide binder solution are such that they can uniformly disperse or dissolve the material and does not allow the reaction product to precipitate. Such solvents include monohydric alcohols, such as methanol, ethanol, 1-propanol, 2-propanol, 1-butanol, 2-butanol, 2-methylpropanol, 1-pentanol, 2-pentanol, cyclopentanol, 2-methylbutanol, 3-methylbutanol, 1-hexanol, 2-hexanol, 3-hexanol, 4-methyl-2-pentanol, 2-methyl-1-pentanol, 2-ethylbutanol, 2,4-dimethyl-3-pentanol, 3-ethylbutanol, 1-heptanol, 2-heptanol, 1-octanol, and 2-octanol; dihydric alcohols, such as ethylene glycol and triethylene glycol; ether alcohols, such as methoxyethanol, ethoxyethanol, propoxyethanol, isopropoxyethanol, butoxyethanol, 1-methoxy-2-propanol, 1-ethoxy-2-propanol, and 1-propoxy-2-propanol; ethers, such as dimethoxyethane, Diglyme, tetrahydrofuran, dioxane, diisopropyl ether, dibutyl ether, and cyclopentyl methyl ether; esters, such as ethyl formate, ethyl acetate, n-butyl acetate, ethylene glycol monomethyl ether acetate, ethylene glycol monoethyl ether acetate, ethylene glycol monobutyl ether acetate, and propylene glycol monomethyl ether acetate; aliphatic or alicyclic hydrocarbons, such as n-hexane, n-octane, cyclohexane, cyclopentane, and cyclooctane; aromatic hydrocarbons, such as toluene, xylene, and ethylbenzene; ketones, such as acetone, methyl ethyl ketone, methyl isobutyl ketone, cyclopentanone, and cyclohexanone; chlorinated hydrocarbons, such as chloroform, methylene chloride, carbon tetrachloride, and tetrachloroethane; aprotic polar solvents, such as N-methylpyrrolidone, N,N-dimethylformamide, N,N-dimethylacetamide, and ethylene carbonate. The solvent may be a mixture of two or more of these solvents.

The dispersion liquid of the silicon oxide particles 15 and the solution of the binder 16 or the mixture thereof is applied by, for example, spin coating, blade coating, roll coating, slit coating, printing, or dip coating. If an optical member having recesses or any other three-dimensional complex shape is manufactured, spin coating is advantageous from the viewpoint of forming a uniform thickness.

After a layer in which the silicon oxide particles 15 are bound to each other with the binder 16 has been formed, the layer is dried and/or cured. This drying and/or curing operation is intended to remove the solvent or to promote the reaction between the silicon oxide binder molecules or between the silicon oxide binder and the silicon oxide particles. This operation may be performed at a temperature in the range of 20° C. to 200° C., desirably in the range of 60° C. to 150° C. If the temperature for drying and/or curing is less than 20° C., the solvent remains in the porous layer and the wear resistance will be reduced. If the temperature for drying or curing exceeds 200° C., the binder will be excessively cured to the extent that it will be likely to be cracked. The time period for drying or curing is desirably in the range of 5 minutes to 24 hours, such as 15 minutes to 5 hours. If the drying or curing time is less than 5 minutes, part of the solvent will remain. Consequently, the in-plane variation in refractive index can be increased. In contrast, if the drying or curing time exceeds 24 hours, the binder will be likely to be cracked.

If the dispersion of the silicon oxide particles and silicon oxide binder solution are separately applied in that order onto the substrate 12, after the dispersion liquid of the silicon oxide particles has been applied, the coating of the dispersion liquid may be dried and/or fired.

For attaching the fluororesin onto the porous layer 13, a solution of the fluororesin is applied by, for example, spin coating, blade coating, roll coating, slit coating, printing, or dip coating. The solvent of the fluororesin solution desirably has a high compatibility in view of oil repellency. Examples of the solvent used in the fluororesin solution include hydrofluoroether, perfluorocarbon, and a mixture thereof. The fluororesin content in the solution may be in the range of 0.04% by mass to 0.1% by mass.

There will now be described the step of alkylsilylating the silicon oxide particles 15 in the vicinity of the surface of the porous layer 13. For alkylsilylation, an alkylsilazane compound is suitably used. More specifically, the porous layer 13 may be exposed to an atmosphere containing an alkylsilazane compound, or a solution of an alkylsilazane compound in a solvent may be applied onto the porous layer 13.

The silazane bond (Si—N) of alkylsilazane compounds is reactive. When the silicon oxide particles in the vicinity of the surface of the porous layer 13 come into contact with an alkylsilazane compound, the alkylsilazane compound reacts with the silanol groups (Si—OH) on the surfaces of the silicon oxide particles to form Si—O—Si bonds. Thus, alkylsilylated silicon oxide particles 17 are produced.

Examples of the alkylsilazane compound that can be used in the present embodiment include (dimethylamino)trimethylsilane, (diethylamino)trimethylsilane, butyldimethyl(dimethylamino)silane, octyldimethyl(dimethylamino)silane, diphenylmethyl(dimethylamino)silane, N-methyl-N-trimethylsilylacetamide, N-methyl-N-trimethylsilyltrifluoroacetamide, N-trimethylsilylacetamide, N-trimethylsilylimidazole, 1,1,1,3,3,3-hexamethyldisilazane, 1,1,3,3-tetramethyldisilazane, 1,3-divinyl-1,1,3,3-tetramethyldisilazane, 1,3-dipropyl-1,1,3,3-tetramethyldisilazane, 1,3-dibutyl-1,1,3,3-ditetramethyldisilazane, 1,3-dioctyl-1,1,3,3-tetramethyldisilazane, 1,3-bis(3,3,3-trifluoropropyl)-1,1,3,3-tetramethyldisilazane, 1,3-diphenyl-1,1,3,3-tetra methyldisilazane, 1,1,3,3-tetraphenyl-1,3-dimethyldisilazane, N,O-bis(trimethylsilyl)acetamide, N,O-bis(trimethylsilyl)trifluoroacetamide, bis(dimethylamino)dimethylsilane, bis(diethylamino)dimethylsilane, dimethylbis(s-butylamino)silane, phenylmethylbis(dimethylamino)silane, 2,2,4,4,6,6-hexamethylcyclotrisilazane, 2,4,6-trimethyl-2,4,6-trivinylcyclotrisilazane, 2,2,4,4,6,6,8,8-octamethylcyclotetrasilazane, and tris(dimethylamino)methylsilane.

Alkylsilazane compounds represented by the following formulas (5), (6), and (7) are advantageous because these compound are more reactive than other alkylsilazane compounds and less likely to remain as unreacted matter.

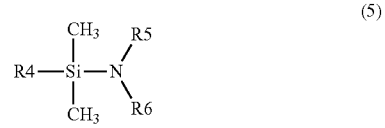

(5)

In formula (5), R4 represents a hydrogen atom or a monovalent organic group selected from the group consisting of linear or branched alkyl groups having a carbon number of 1 to 8, alkenyl groups, and fluorinated alkyl groups. R5 and R6 each represent a species selected from the group consisting of a hydrogen atom, alkyl groups having a carbon number of 1 to 3, an acetyl group, and a trifluoroacetyl group, or form an imidazoline ring together.

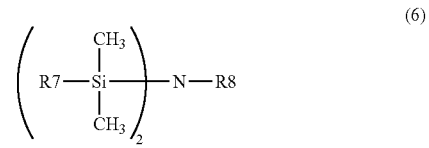

(6)

In formula (6), R7 represents a hydrogen atom or a monovalent organic group selected from the group consisting of linear or branched alkyl groups having a carbon number of 1 to 8, alkenyl groups, and fluorinated alkyl groups, and R8 represents a hydrogen atom or an alkyl group having a carbon number of 1 to 3.

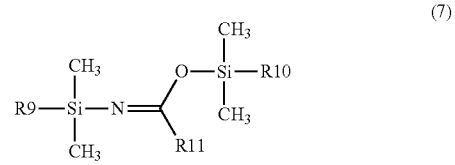

(7)

In formula (7), R9 and R10 each represent a monovalent organic group selected from the group consisting of linear or branched alkyl group having a carbon number of 1 to 8, alkenyl groups, and fluorinated alkyl groups, and R11 represents a methyl group or a trifluoromethyl group.

Examples of the alkylsilazane compounds of the above formulas include (dimethylamino)trimethylsilane, (diethylamino)trimethylsilane, N-methyl-N-trimethylsilylacetamide, N-methyl-N-trimethylsilyltrifluoroacetamide, N-trimethylsilylacetamide, N-trimethylsilylimidazole, 1,1,1,3,3,3-hexamethyldisilazane, 1,3-divinyl-1,1,3,3-tetramethyldisilazane, 1,3-dipropyl-1,1,3,3-tetramethyldisilazane, 1,3-bis(3,3,3-trifluoropropyl)-1,1,3,3-tetramethyldisilazane, N,O-bis(trimethylsilyl)acetamide, and N,O-bis(trimethylsilyl)trifluoroacetamide.

Alkylsilazane compounds represented by the following formulas (8) and (9) are advantageous in terms of bifunctionality and water repellency.

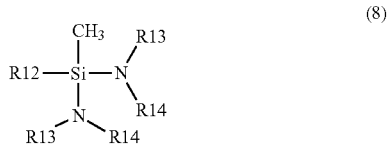

(8)

In formula (8), R12 represents a monovalent organic group selected from the group consisting of linear or branched alkyl groups having a carbon number of 1 to 8, alkenyl groups, and fluorinated alkyl groups, and R13 and R14 each represent a hydrogen atom or an alkyl group having a carbon number of 1 to 3.

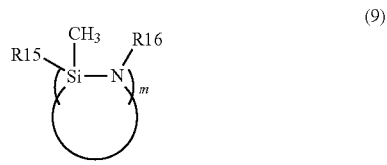

(9)

In formula (9), R15 represents a monovalent organic group selected from the group consisting of linear or branched alkyl groups having a carbon number of 1 to 8, alkenyl groups, and fluorinated alkyl groups, and R16 represents a hydrogen atom or an alkyl group having a carbon number of 1 to 3. m is an integer of 3 or 4.

Examples of alkylsilazane compounds of formulas (8) and (9) include bis(dimethylamino)dimethylsilane, bis(diethylamino)dimethylsilane, dimethylbis(s-butylamino)silane, 2,2,4,4,6,6-hexamethylcyclotrisilazane, and 2,4,6-trimethyl-2,4,6-trivinylcyclotrisilazane.

For exposing to an atmosphere containing an alkylsilazane compound, a gas containing the alkylsilazane compound may be sprayed onto the porous layer 13, or a gas containing the alkylsilazane compound and the porous layer 13 may be confined together in a container. Advantageously, a mixed gas containing an alkylsilazane compound and the porous layer 13 are confined together in a container. This treatment can be performed with a small amount of alkylsilazane compound. This treatment in the container may be performed under atmospheric pressure or reduced pressure. In view of convenience, treatment under atmospheric pressure is advantageous. The concentration of the alkylsilazane compound in the mixed gas is advantageously in the range of 5 mg/L to 200 mg/L.

The temperature of the atmosphere containing an alkylsilazane compound to which the porous layer 13 is exposed is desirably in the range of 10° C. to 60° C., such as in the range of 20° C. to 40° C. If the temperature of this atmosphere is less than 10° C., the alkylsilazane compound may not sufficiently impart water repellency to the surface of the porous layer 13. If the temperature exceeds 60° C., the alkylsilazane compound can swell the porous layer 13.

The exposure time to the atmosphere containing an alkylsilazane compound is desirably in the range of 0.5 hour to 5 hours, such as in the range of 1 hour to 3 hours. If the exposure time is less than 0.5 hour, the silicon oxide particles are not sufficiently alkylsilylated, and accordingly dirt can diffuse. If the exposure time exceeds 5 hours, the porous layer 13 is entirely alkylsilylated, and thus the refractive index can be excessively increased.

After the exposure to the atmosphere containing an alkylsilazane compound, the excess alkylsilazane compound in the layer may be removed. If the alkylsilazane compound is volatile, the excess alkylsilazane compound can be removed by simply allowing the porous layer 13 to stand in an atmosphere not containing any alkylsilazane compound. If the volatility of the alkylsilazane compound is low, the alkylsilazane compound may be removed by heating or decompression. If the alkylsilazane compound is removed by heating, the heating temperature may be in the range of 40° C. to 150° C. Alternatively, the excess alkylsilazane compound may be washed away with a solvent. In this instance, a volatile solvent, such as methanol, ethanol, or acetone, is advantageously used.

In the case of applying an alkylsilazane compound solution, a solution prepared by uniformly dissolving an alkylsilazane compound in a solvent can be applied onto the porous layer 13.

The solvent of the alkylsilazane compound is desirably an aprotic solvent. Examples of the aprotic solvent include ethers, such as dimethoxyethane, Diglyme, tetrahydrofuran, dioxane, diisopropyl ether, dibutyl ether, and cyclopentyl methyl ether; esters, such as ethyl formate, ethyl acetate, n-butyl acetate, ethylene glycol monomethyl ether acetate, ethylene glycol monoethyl ether acetate, ethylene glycol monobutyl ether acetate, and propylene glycol monomethyl ether acetate; aliphatic or alicyclic hydrocarbons, such as n-hexane, n-octane, cyclohexane, cyclopentane, and cyclooctane; aromatic hydrocarbons, such as toluene, xylene, and ethylbenzene; ketones, such as acetone, methyl ethyl ketone, methyl isobutyl ketone, cyclopentanone, and cyclohexanone; chlorinated hydrocarbons, such as chloroform, methylene chloride, carbon tetrachloride, and tetrachloroethane; fluorine-containing solvents, such as hydrofluoroether and perfluorocarbon; and N-methylpyrrolidone, N,N-dimethylformamide, and N,N-dimethylacetamide.

Among the aprotic solvents are advantageous dibutyl ether, cyclopentyl methyl ether, n-butyl acetate, propylene glycol monomethyl ether acetate, cyclooctane, toluene, xylene, ethylbenzene, methyl isobutyl ketone, cyclopentanone, cyclohexanone, hydrofluoro ether, perfluorocarbon, and N,N-dimethylacetamide. These solvents are not much hygroscopic and are easy to apply.

Although the step of attaching a fluororesin and the step of alkylsilylation have been separately described, it is desirable to perform these steps at one time. For simultaneously performing the two steps, a fluororesin solution containing an alkylsilazane compound may be applied.

The proportion of the alkylsilazane compound in the solution containing both the fluororesin and the alkylsilazane compound is desirably in the range of 5 parts by mass to 1000 parts by mass, such as 10 parts by mass to 500 parts by mass, relative to 100 parts by mass of the fluororesin.

EXAMPLES

The subject matter of the invention will be further described in detail with reference to Examples below. The scope of the disclosure is not limited to the following Examples.

Preparation of Coating Liquids (2-1) Preparation of Chainlike $SiO_2$ Particle Coating Liquid (2-1)

With 22.13 g of 1-ethoxy-2-propanol, 6.00 g of a dispersion liquid of chainlike $SiO_2$ particles in 2-propanol (IPA), IPA-ST-UP (produced by Nissan Chemical Industries, average particle size: 12 nm, solids content: 15% by mass), was diluted. Thus, chainlike $SiO_2$ particle coating liquid (2-1) (solids content: 3.20% by mass) was prepared. It was confirmed by dynamic light scattering particle size distribution measurement (with Zetasizer Nano ZS manufactured by Malvern Instruments) that chainlike $SiO_2$ particles of 12 nm in minor axis and 90 nm in major axis were dispersed in the resulting liquid.

(2-2) Preparation of SiO$_2$ Hollow Particle Coating Liquid (2-2)

With 28.17 g of 1-methoxy-2-propanol (PGME), 6.00 g of a dispersion liquid of SiO$_2$ hollow particles in IPA, Sururia 1110 (produced by JGC Catalysts & Chemicals, average particle size: 55 nm, solids content: 20.50% by mass), was diluted. Thus, SiO$_2$ hollow particle coating liquid (2-2) (solids content: 3.60% by mass) was prepared. It was confirmed by dynamic light scattering particle size distribution measurement (with Zetasizer Nano ZS manufactured by Malvern Instruments) that SiO$_2$ hollow particles of 55 nm in diameter were dispersed in the resulting liquid.

(2-3) Preparation of SiO$_2$ Spherical Particle Coating Liquid (2-3)

With 24.00 g of 1-ethoxy-2-propanol, 6.00 g of a dispersion liquid of SiO$_2$ spherical particles in PGME, PGM-ST (produced by Nissan Chemical Industries, average particle size: 12 nm, solids content: 30% by mass), was diluted. Thus, SiO$_2$ spherical particle coating liquid (2-3) (solids content: 6.00% by mass) was prepared. It was confirmed by dynamic light scattering particle size distribution measurement (with Zetasizer Nano ZS manufactured by Malvern Instruments) that SiO$_2$ spherical particles of 12 nm in diameter were dispersed in the resulting liquid.

(2-4) Preparation of SiO$_2$ Binder Coating Liquid (2-4)

To the solution of 4.17 g of ethyl silicate in 2.30 g of ethanol was slowly added a previously prepared solution containing 1.7 g of nitric acid water (content: 3.7% by mass) and 2.30 g of ethanol. After stirring the mixture for 15 hours at room temperature, 2.00 g of the resulting reaction liquid was diluted with 36.33 g of 2-ethyl-1-butanol to yield SiO$_2$ binder coating liquid (2-4) (solids content: 0.6% by mass).

(2-5) Preparation of Fluororesin/Alkylsilazane Solutions (2-5) to (2-15)

To 20.00 g of a solution of an acrylic fluororesin having a fluorinated hydrocarbon group, Durasurf DS-1101 S135 (produced by Harves, solids content: 0.1% by mass), was added 0.004 g to 0.10 g of an alkylsilazane compound. The materials were mixed at room temperature. Thus, fluororesin/alkylsilazane solutions (2-5) to (2-15) each containing a fluororesin and an alkylsilazane compound with a ratio of 1/0.2 to 1/5 were prepared.

Evaluation (2-6) Measurement of Thickness

Thickness was determined from the results of measurement with a spectroscopic ellipsometer (VASE, manufactured by J. A. Woollam) at wavelengths from 380 nm to 800 nm.

(2-7) Measurement of Refractive Index

Refractive index was measured with a spectroscopic ellipsometer (VASE, manufactured by J. A. Woollam) at wavelengths from 380 nm to 800 nm. The refractive index at a wavelength of 550 nm was used for evaluation.

(2-8) Evaluation of Contact Angle

The contact angle of 2 μL of pure water or hexadecane droplet on a sample was measured with a full automatic contact angle meter DM-701 (manufactured by Kyowa Interface Science).

The contact angle of pure water was rated according to the following criteria:
A: 110° or more
B: 100° or more and less than 110°
B: less than 100°

The contact angle of hexadecane was rated according to the following criteria:
A: 60° or more
B: less than 60°

(2-9) Wipe-Off Test

Each sample film on a substrate on which the contact angle of hexadecane had been measured was wiped with a polyester wiper AlphaWipe TX1009 (manufactured by Texwipe) soaked with ethanol several times and then checked for a trace of droplet or a mark after wiping. The results were rated according to the following criteria:
A: No traces of hexadecane droplets nor marks after wiping were observed.
B: Either a trace of hexadecane droplet or a mark after wiping was visually observed.

(2-10) High Temperature, High Humidity Test

Each sample was allowed to stand in an environmental test apparatus SH-241 (manufactured by ESPEC) set to 70° C. and 100% RH for 72 hours, and the changes of the sample in refractive index and contact angle of pure water were examined.
A: The variation in refractive index was less than 0.01, and thus the refractive index was hardly varied.
B: The variation in refractive index was 0.01 or more and less than 0.04.
C: The variation in refractive index was 0.04 or more.

(2-11) XPS Analysis in Depth Direction

Quantera SXM manufacture by ULVAC-PHI was used. A monochromatic Al X-ray source was used, and the X-ray beam diameter was 100 μm. Spectra were obtained by scanning an area of 500 μm×500 μm of each sample with this X-ray beam. The composition of the sample was analyzed in the depth direction while being etched with an argon ion gun.

Example 2-1

In Example 2-1, an appropriate amount of chainlike SiO$_2$ particle coating liquid (2-1) was dropped onto a glass substrate (nd=1.77, vd=50) of 30 mm in diameter and 1 mm in thickness and was subjected to spin coating at 3500 rpm for 20 s to yield a porous layer of chainlike SiO$_2$ particles on the substrate. Onto the resulting porous layer made of only chainlike SiO$_2$ particles, an appropriate amount of SiO$_2$ binder coating liquid (2-4) was dropped and subjected to spin coating at 4500 rpm for 20 s. Furthermore, an appropriate amount of a solution of an acrylic fluororesin having a fluorinated hydrocarbon group, Durasurf DS-1101 S135 (produced by Harves, solids content: 0.10% by mass), was dropped and subjected to spin coating at 3000 rpm for 20 s. Then, the sample was heated at 140° C. for 30 minutes in a hot air circulation oven to form a film including a porous layer in which chainlike SiO$_2$ particles are bound to each other with the binder and onto which the acrylic resin having a fluorinated hydrocarbon group is attached.

The sample having the film was placed in a 610 mL glass container together with 0.02 g an alkylsilazane compound 1,1,1,3,3,3-hexamethyldisilazane in a glass laboratory dish. The glass container was sealed with a propylene lid with a silicone resin gasket and allowed to stand at 23° C. for 3 hours. Then, the sample having the film was removed and allowed to stand in the air for 30 minutes. All the 1,1,1,3,3,3-hexamethyldisilazane in the container was volatilized. The concentration of the alkylsilazane compound that had been in the container was calculated from the amount of volatilization and was 33 mg/L.

The porous layer of the resulting optical member had a refractive index of 1.253 and a thickness of 120 nm, and the contact angles of pure water and hexadecane on the porous layer were 118° and 64°, respectively. In the wipe-off test of the porous layer onto which hexadecane had been dropped, no traces of droplets nor marks after wiping were observed. The variation in refractive index in the high temperature, high humidity test was as small as less than 0.01. Evaluation test results are shown in Table 3.

The XPS analysis of the porous layer in the depth direction showed that fluorine was concentrated at the surface of the porous layer and that a large amount of carbon was present in a shallow region from the surface. These results suggest that the fluororesin is present on the porous layer and that the surfaces of the chainlike $SiO_2$ particles in the vicinity of the surface of the porous layer were modified with trimethylsilyl groups.

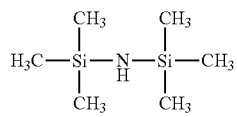

1,1,1,3,3,3-Hexamethyldisilazane

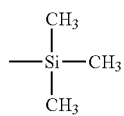

Trimethylsilyl Group

Example 2-2

In Example 2-2, an appropriate amount of $SiO_2$ hollow particle coating liquid (2-2) was dropped onto a glass substrate (nd=1.77, vd=50) of 30 mm in diameter and 1 mm in thickness and was subjected to spin coating at 3000 rpm for 20 s to yield a porous layer made of only $SiO_2$ hollow particles on the substrate. Onto the resulting porous layer of $SiO_2$ hollow particles, an appropriate amount of $SiO_2$ binder coating liquid (2-4) was dropped and subjected to spin coating at 4500 rpm for 20 s. Furthermore, an appropriate amount of a solution of an acrylic fluororesin having a fluorinated hydrocarbon group, Durasurf DS-1101 S135 (produced by Harves, solids content: 0.10% by mass), was dropped and subjected to spin coating at 3000 rpm for 20 s. Then, the sample was heated at 140° C. for 30 minutes in a hot air circulation oven to form a film including a porous layer in which $SiO_2$ hollow particles are bound to each other with the binder and onto which the acrylic fluororesin having a fluorinated hydrocarbon group is attached.

Subsequently, the porous layer was subjected to alkylsilylation with 1,1,1,3,3,3-hexamethyldisilazane in the same manner as in Example 2-1. The porous layer of the resulting optical member had a refractive index of 1.252 and a thickness of 118 nm, and the contact angles of pure water and hexadecane on the porous layer were 116° and 65°, respectively. In the wipe-off test of the porous layer onto which hexadecane had been dropped, no traces of droplets nor marks after wiping were observed. The variation in refractive index in the high temperature, high humidity test was as small as less than 0.01.

The XPS analysis of the porous layer in the depth direction showed that fluorine was concentrated at the surface of the porous layer and that a large amount of carbon was present in a shallow region from the surface. These results suggest that the fluororesin is present on the porous layer and that the surfaces of the $SiO_2$ hollow particles in the vicinity of the surface of the porous layer were modified with trimethylsilyl groups.

Example 2-3

In Example 2-3, a porous layer made of only chainlike $SiO_2$ particles was formed on a glass substrate (nd=1.77, vd=50) of 30 mm in diameter and 1 mm in thickness in the same manner as in Example 2-1. Then, in the same manner as in Example 2-1, $SiO_2$ binder coating liquid (2-4) and the solution of the acrylic fluororesin having a fluorinated hydrocarbon group were applied in that order onto the resulting porous layer and heated to yield a film including a porous layer in which chainlike $SiO_2$ particles are bound to each other with the binder and onto which the acrylic fluororesin having a fluorinated hydrocarbon group is attached.

Furthermore, the porous layer was subjected to alkylsilylation in the same manner as in Example 2-1, using 1,3-bis(3,3,3-trifluoropropyl)-1,1,3,3-tetramethyldisilazane as the alkylsilazane compound. The amount of 1,3-bis(3,3,3-trifluoropropyl)-1,1,3,3-tetramethyldisilazane volatilized for 5 hours in the container was 0.003 g. The concentration of the alkylsilazane compound that had been in the container was calculated from the amount of volatilization and was 5.0 mg/L.

The porous layer of the resulting optical member had a refractive index of 1.253 and a thickness of 120 nm, and the contact angles of pure water and hexadecane on the porous layer were 116° and 64°, respectively. In the wipe-off test of the porous layer onto which hexadecane had been dropped, no traces of droplets nor marks after wiping were observed. The variation in refractive index in the high temperature, high humidity test was as small as less than 0.01. Evaluation test results are shown in Table 3.

The XPS analysis of the porous layer in the depth direction showed that fluorine was concentrated at the surface of the porous layer and that a large amount of carbon was present in a shallow region from the surface. These results suggest that the fluororesin is present on the porous layer and that surfaces of the chainlike $SiO_2$ particles in the vicinity of the surface of the porous layer were modified with trimethylsilyl groups.

Example 2-4

In Example 2-4, a porous layer made of only $SiO_2$ hollow particles was formed on a glass substrate (nd=1.77, vd=50) of 30 mm in diameter and 1 mm in thickness in the same manner as in Example 2-2. Then, in the same manner as in Example 2-2, $SiO_2$ binder coating liquid (2-4) and the solution of an acrylic fluororesin having a fluorinated hydrocarbon group were applied in that order onto the resulting porous layer and heated to yield a film including a porous layer in which $SiO_2$ hollow particles are bound to each other with the binder.

Subsequently, the porous layer was subjected to alkylsilylation with 1,1,1,3,3,3-hexamethyldisilazane in the same manner as in Example 2-2. The porous layer of the resulting optical member had a refractive index of 1.251 and a thickness of 118 nm, and the contact angles of pure water and hexadecane on the porous layer were 114° and 70°, respectively. In the wipe-off test of the porous layer onto which hexadecane had been dropped, no traces of droplets nor marks after wiping were observed. The variation in refractive index in the high temperature, high humidity test was as small as less than 0.01.

The XPS analysis of the porous layer in the depth direction showed that fluorine was concentrated at the surface of the porous layer and that a large amount of carbon was present in a shallow region from the surface. These results suggest that the fluororesin is present on the porous layer and that the surfaces of the $SiO_2$ hollow particles in the vicinity of the surface of the porous layer were modified with trimethylsilyl groups.

Comparative Example 2-1

In Comparative Example 2-1, a porous layer made of only chainlike $SiO_2$ particles was formed on a glass substrate (nd=1.77, vd=50) of 30 mm in diameter and 1 mm in thickness in the same manner as in Example 2-1. Then, in the same manner as in Example 2-1, $SiO_4$ binder coating liquid (2-4) and the solution of an acrylic fluororesin having a fluorinated hydrocarbon group, were applied in that order onto the resulting porous layer and heated to yield a film including a porous layer in which chainlike $SiO_2$ particles are bound to each other with the binder and onto which the acrylic fluororesin having a fluorinated hydrocarbon group, is attached.

The porous layer of the resulting optical member had a refractive index of 1.248 and a thickness of 120 nm, and the contact angles of pure water and hexadecane on the porous layer were 111° and 67°, respectively. In the wipe-off test of the porous layer onto which hexadecane had been dropped, a mark after wiping was observed. The variation in refractive index in the high temperature, high humidity test was 0.03.

The XPS analysis of the porous layer in the depth direction showed that fluorine and carbon were concentrated at the surface of the porous layer. This suggests that the fluororesin is present on the porous layer.

Comparative Example 2-2

In Comparative Example 2-2, a porous layer made of only chainlike $SiO_2$ particles was formed on a glass substrate (nd=1.77, vd=50) of 30 mm in diameter and 1 mm in thickness in the same manner as in Example 2-1. Then, in the same manner as in Example 2-1, $SiO_2$ binder coating liquid (2-4) was applied onto the resulting porous layer and heated to yield a film including a porous layer in which chainlike $SiO_2$ particles are bound to each other with the binder. No fluororesin was applied.

The porous layer of the resulting optical member had a refractive index of 1.240 and a thickness of 117 nm, and the contact angles of pure water and hexadecane on the porous layer were each 10° or less. In the wipe-off test of the porous layer onto which hexadecane had been dropped, a mark after wiping was observed. The variation in refractive index in the high temperature, high humidity test was as large as over 0.04.

The XPS analysis of the porous layer in the depth direction did not show the presence of fluorine or carbon in the porous layer.

TABLE 3

| | ①Shape of particles | Fluororesin | Alkylsilazane compound Compound | Concentration mg/L | Treatment time (h) | Thickness nm | Refractive index λ: 550 nm | Contact angle (degree) Pure water | Hexadecane | EtOH Traces or marks after wiping | High temp. high humidity test |
|---|---|---|---|---|---|---|---|---|---|---|---|
| Example 2-1 | Chain | Applied | 1,1,1,3,3,3-Hexamethyldisilazane | 33 | 3 | 120 | 1.253 | A118 | A64 | A: Not observed | A |
| Example 2-2 | Hollow | Applied | 1,1,1,3,3,3-Hexamethyldisilazane | 33 | 3 | 118 | 1.252 | A116 | A65 | A: Not observed | A |
| Example 2-3 | Chain | Applied | 1,3-Bis(3,3,3-trifluoropropyl)-1,1,3,3-tetramethyldisilazane | 5 | 5 | 120 | 1.253 | A116 | A64 | A: Not observed | A |
| Example 2-4 | Hollow | Applied | 1,3-Bis(3,3,3-trifluoropropyl)-1,1,3,5-tetramethyldisilazane | 5 | 5 | 118 | 1.251 | A114 | A70 | A: Not observed | A |
| Comparative Example 2-1 | Chain | Applied | None | — | — | 120 | 1.248 | A111 | A67 | B: Observed | B |
| Comparative Example 2-2 | Chain | Not applied | None | — | — | 117 | 1.240 | B < 10 | B < 10 | B: Observed | C |

Example 2-5

In Example 2-5, a porous layer made of only chainlike $SiO_2$ particles was formed on a glass substrate (nd=1.77, vd=50) of 30 mm in diameter and 1 mm in thickness in the same manner as in Example 2-1. The porous layer was coated with $SiO_2$ binder coating liquid (2-4) in the same manner as in Example 2-1. Subsequently, fluororesin/alkylsilazane compound solution 5 (acrylic fluororesin having a fluorinated hydrocarbon group/1,1,1,3,3,3-hexamethyldisilazane=1/5) was applied and heated instead of the fluororesin solution. Thus, application of the acrylic fluororesin having a fluorinated hydrocarbon group, and alkylsilylation were simultaneously performed on the porous layer in which chainlike $SiO_2$ particles were bound to each other with the binder.

The porous layer of the resulting optical member had a refractive index of 1.253 and a thickness of 120 nm, and the contact angles of pure water and hexadecane on the porous layer were 117° and 64°, respectively. In the wipe-off test of the porous layer onto which hexadecane had been dropped, no traces of droplets nor marks after wiping were observed. The variation in refractive index in the high temperature, high humidity test was as small as less than 0.01. Evaluation test results are shown in Table 4.

The XPS analysis of the porous layer in the depth direction showed that fluorine was concentrated at the surface of the porous layer and that a large amount of carbon was present in a shallow region from the surface. These results suggest that the fluororesin is present on the porous layer and that the surfaces of the chainlike $SiO_2$ particles in the vicinity of the surface of the porous layer were modified with trimethylsilyl groups.

Example 2-6

In Example 2-6, a porous layer made of only chainlike $SiO_2$ particles was formed on a glass substrate (nd=1.77, vd=50) of 30 mm in diameter and 1 mm in thickness in the same manner as in Example 2-1. The porous layer was coated with $SiO_2$ binder coating liquid (2-4) in the same manner as in Example 2-1. Subsequently, fluororesin/alkylsilazane compound solution 6 (acrylic fluororesin having a fluorinated hydrocarbon group/1,1,1,3,3,3-hexamethyldisilazane=1/2.5) was applied and heated instead of the fluororesin solution. Thus, application of the acrylic fluororesin having a fluorinated hydrocarbon group, and alkylsilylation were simultaneously performed on the porous layer in which chainlike $SiO_2$ particles were bound to each other with the binder.

The porous layer of the resulting optical member had a refractive index of 1.252 and a thickness of 120 nm, and the contact angles of pure water and hexadecane on the porous layer were 117° and 65°, respectively. In the wipe-off test of the porous layer onto which hexadecane had been dropped, no traces of droplets nor marks after wiping were observed. The variation in refractive index in the high temperature, high humidity test was as small as less than 0.01.

The XPS analysis of the porous layer in the depth direction showed that fluorine was concentrated at the surface of the porous layer and that a large amount of carbon was present in a shallow region from the surface. These results suggest that the fluororesin is present on the porous layer and that the surfaces of the chainlike $SiO_2$ particles in the vicinity of the surface of the porous layer were modified with trimethylsilyl groups.

Example 2-7

In Example 2-7, a porous layer made of only chainlike $SiO_2$ particles was formed on a glass substrate (nd=1.77, vd=50) of 30 mm in diameter and 1 mm in thickness in the same manner as in Example 2-1. The porous layer was coated with $SiO_2$ binder coating liquid (2-4) in the same manner as in Example 2-1. Subsequently, fluororesin/alkylsilazane compound solution 7 (acrylic fluororesin having a fluorinated hydrocarbon group/1,1,1,3,3,3-hexamethyldisilazane=1/0.2) was applied and heated instead of the fluororesin solution. Thus, application of the acrylic fluororesin having a fluorinated hydrocarbon group, and alkylsilylation were simultaneously performed on the porous layer in which chainlike $SiO_2$ particles were bound to each other with the binder.

The porous layer of the resulting optical member had a refractive index of 1.251 and a thickness of 120 nm, and the contact angles of pure water and hexadecane on the porous layer were 113° and 69°, respectively. In the wipe-off test of the porous layer onto which hexadecane had been dropped, no traces of droplets nor marks after wiping were observed. The variation in refractive index in the high temperature, high humidity test was as small as less than 0.01.

The XPS analysis of the porous layer in the depth direction showed that fluorine was concentrated at the surface of the porous layer and that a large amount of carbon was present in a shallow region from the surface. These results suggest that the fluororesin is present on the porous layer and that the surfaces of the chainlike $SiO_2$ particles in the vicinity of the surface of the porous layer were modified with trimethylsilyl groups.

Example 2-8

In Example 2-8, a porous layer made of only $SiO_2$ hollow particles was formed on a glass substrate (nd=1.77, vd=50) of 30 mm in diameter and 1 mm in thickness in the same manner as in Example 2-2. The porous layer was coated with $SiO_2$ binder coating liquid (2-4) in the same manner as in Example 2-2. Subsequently, fluororesin/alkylsilazane compound solution 6 (acrylic fluororesin having a fluorinated hydrocarbon group/1,1,1,3,3,3-hexamethyldisilazane=1/2.5) was applied and heated instead of the fluororesin solution. Thus, application of the acrylic fluororesin having a fluorinated hydrocarbon group and alkylsilylation were simultaneously performed on the porous layer in which $SiO_2$ hollow particles were bound to each other with the binder.

The porous layer of the resulting optical member had a refractive index of 1.250 and a thickness of 118 nm, and the contact angles of pure water and hexadecane on the porous layer were 115° and 65°, respectively. In the wipe-off test of the porous layer onto which hexadecane had been dropped, no traces of droplets nor marks after wiping were observed. The variation in refractive index in the high temperature, high humidity test was as small as less than 0.01.

The XPS analysis of the porous layer in the depth direction showed that fluorine was concentrated at the surface of the porous layer and that a large amount of carbon was present in a shallow region from the surface. These results suggest that the fluororesin is present on the porous layer and that the surfaces of the $SiO_2$ hollow particles in the vicinity of the surface of the porous layer were modified with trimethylsilyl groups.

Example 2-9

In Example 2-9, an appropriate amount of $SiO_2$ spherical particle coating liquid (2-3) was dropped onto a glass substrate (nd=1.77, vd=50) of 30 mm in diameter and 1 mm in thickness and was subjected to spin coating at 3000 rpm for 20 s to yield a porous layer made of only $SiO_2$ spherical particles on the substrate. Onto the resulting porous layer of $SiO_2$ spherical particles, an appropriate amount of $SiO_2$ binder coating liquid (2-4) was dropped and subjected to spin coating at 4500 rpm for 20 s. Furthermore, fluororesin/alkylsilazane compound solution 6 (acrylic fluororesin having a fluorinated hydrocarbon group/1,1,1,3,3,3-hexamethyldisilazane=1/2.5) was applied and subjected to spin coating at 3000 rpm for 20 s. Then, the sample was heated at 140° C. for 30 minutes in a hot air circulation oven. Thus, application of the acrylic fluororesin having a fluorinated hydrocarbon group and alkylsilylation were simultaneously performed on the porous layer in which $SiO_2$ spherical particles are bound to each other with the binder.

The porous layer of the resulting optical member had a refractive index of 1.343 and a thickness of 117 nm, and the contact angles of pure water and hexadecane on the porous layer were 105° and 65°, respectively. In the wipe-off test of the porous layer onto which hexadecane had been dropped, no traces of droplets nor marks after wiping were observed.

The variation in refractive index in the high temperature, high humidity test was as small as less than 0.01.

The XPS analysis of the porous layer in the depth direction showed that fluorine was concentrated at the surface of the porous layer and that a large amount of carbon was present in a shallow region from the surface. These results suggest that the fluororesin is present on the porous layer and that the surfaces of the SiO$_2$ spherical particles in the vicinity of the surface of the porous layer were modified with trimethylsilyl groups.

Example 2-10

In Example 2-10, a porous layer made of only chainlike SiO$_2$ particles was formed on a glass substrate (nd=1.77, vd=50) of 30 mm in diameter and 1 mm in thickness in the same manner as in Example 2-1. The porous layer was coated with SiO$_2$ binder coating liquid (2-4) in the same manner as in Example 2-1. Subsequently, fluororesin/alkylsilazane compound solution 8 (acrylic fluororesin having a fluorinated hydrocarbon group/dimethylaminotrimethylsilane=1/2.5) was applied and heated instead of the fluororesin solution. Thus, application of the acrylic fluororesin having a fluorinated hydrocarbon group and alkylsilylation were simultaneously performed on the porous layer in which chainlike SiO$_2$ particles were bound to each other with the binder.

The porous layer of the resulting optical member had a refractive index of 1.252 and a thickness of 120 nm, and the contact angles of pure water and hexadecane on the porous layer were 116° and 64°, respectively. In the wipe-off test of the porous layer onto which hexadecane had been dropped, no traces of droplets nor marks after wiping were observed. The variation in refractive index in the high temperature, high humidity test was as small as less than 0.01.

The XPS analysis of the porous layer in the depth direction showed that fluorine was concentrated at the surface of the porous layer and that a large amount of carbon was present in a shallow region from the surface. These results suggest that the fluororesin is present on the porous layer and that the surfaces of the chainlike SiO$_2$ particles in the vicinity of the surface of the porous layer were modified with trimethylsilyl groups.

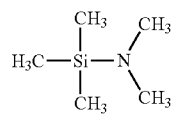

Dimethylaminotrimethylsilane

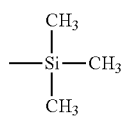

Trimethylsilyl Group

Example 2-11

In Example 2-11, a porous layer made of only chainlike SiO$_2$ particles was formed on a glass substrate (nd=1.77, vd=50) of 30 mm in diameter and 1 mm in thickness in the same manner as in Example 2-1. The porous layer was coated with SiO$_2$ binder coating liquid (2-4) in the same manner as in Example 2-1. Subsequently, fluororesin/alkylsilazane compound solution 9 (acrylic fluororesin having a fluorinated hydrocarbon group/N,O-bis(trimethylsilyl)acetamide=1/2.5) was applied and heated instead of the fluororesin solution. Thus, application of the acrylic fluororesin having a fluorinated hydrocarbon group and alkylsilylation were simultaneously performed on the porous layer in which chainlike SiO$_2$ particles were bound to each other with the binder.

The porous layer of the resulting optical member had a refractive index of 1.252 and a thickness of 120 nm, and the contact angles of pure water and hexadecane on the porous layer were 117° and 65°, respectively. In the wipe-off test of the porous layer onto which hexadecane had been dropped, no traces of droplets nor marks after wiping were observed. The variation in refractive index in the high temperature, high humidity test was as small as less than 0.01.

The XPS analysis of the porous layer in the depth direction showed that fluorine was concentrated at the surface of the porous layer and that a large amount of carbon was present in a shallow region from the surface. These results suggest that the fluororesin is present on the porous layer and that the surfaces of the chainlike SiO$_2$ particles in the vicinity of the surface of the porous layer were modified with trimethylsilyl groups.

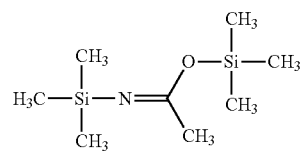

N,O-bis(trimethylsilyl)acetamide

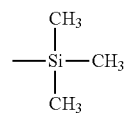

Trimethylsilyl Group

Example 2-12

In Example 2-12, a porous layer made of only chainlike SiO$_2$ particles was formed on a glass substrate (nd=1.77, vd=50) of 30 mm in diameter and 1 mm in thickness in the same manner as in Example 2-1. The porous layer was coated with SiO$_2$ binder coating liquid (2-4) in the same manner as in Example 2-1. Subsequently, fluororesin/alkylsilazane compound solution 10 (acrylic fluororesin having a fluorinated hydrocarbon group/1,3-bis(3,3,3-trifluoropropyl)-1,1,3,3-tetramethyldisilazane=1/2.5) was applied and heated instead of the fluororesin solution. Thus, application of the acrylic fluororesin having a fluorinated hydrocarbon group and alkylsilylation were simultaneously performed on the porous layer in which chainlike SiO$_2$ particles were bound to each other with the binder.

The porous layer of the resulting optical member had a refractive index of 1.253 and a thickness of 120 nm, and the contact angles of pure water and hexadecane on the porous layer were 115° and 67°, respectively. In the wipe-off test of the porous layer onto which hexadecane had been dropped, no traces of droplets nor marks after wiping were observed. The variation in refractive index in the high temperature, high humidity test was as small as less than 0.01.

The XPS analysis of the porous layer in the depth direction showed that fluorine was concentrated at the surface of the porous layer and that large amounts of carbon and fluorine were present in a shallow region from the surface. These results suggest that the fluororesin is present on the porous layer and that the surfaces of the chainlike $SiO_2$ particles in the vicinity of the surface of the porous layer were modified with 3,3,3-trifluoropropyldimethylsilyl groups.

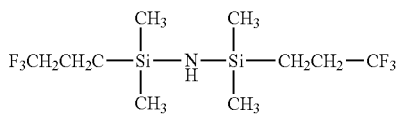

1,3-Bis(3,3,3-trifluoropropyl)-1,1,3,3-tetramethyldisilazane

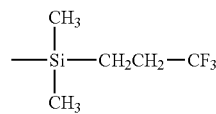

3,3,3-Trifluoropropyldimethylsilyl group

Example 2-13

In Example 2-13, a porous layer made of only chainlike $SiO_2$ particles was formed on a glass substrate (nd=1.77, vd=50) of 30 mm in diameter and 1 mm in thickness in the same manner as in Example 2-1. The porous layer was coated with $SiO_2$ binder coating liquid (2-4) in the same manner as in Example 2-1. Subsequently, fluororesin/alkylsilazane compound solution 11 (acrylic fluororesin having a fluorinated hydrocarbon group/1,3-bis(3,3,3-trifluoropropyl)-1,1,3,3-tetramethyldisilazane=1/0.2) was applied and heated instead of the fluororesin solution. Thus, application of the acrylic fluororesin having a fluorinated hydrocarbon group and alkylsilylation were simultaneously performed on the porous layer in which chainlike $SiO_2$ particles were bound to each other with the binder.

The porous layer of the resulting optical member had a refractive index of 1.251 and a thickness of 120 nm, and the contact angles of pure water and hexadecane on the porous layer were 112° and 72°, respectively. In the wipe-off test of the porous layer onto which hexadecane had been dropped, no traces of droplets nor marks after wiping were observed. The variation in refractive index in the high temperature, high humidity test was as small as less than 0.01.

The XPS analysis of the porous layer in the depth direction showed that fluorine was concentrated at the surface of the porous layer and that large amounts of carbon and fluorine were present in a shallow region from the surface. These results suggest that the fluororesin is present on the porous layer and that the surfaces of the chainlike $SiO_2$ particles in the vicinity of the surface of the porous layer were modified with 3,3,3-trifluoropropyldimethylsilyl groups.

Example 2-14

In Example 2-14, a porous layer made of only $SiO_2$ hollow particles was formed on a glass substrate (nd=1.77, vd=50) of 30 mm in diameter and 1 mm in thickness in the same manner as in Example 2-2. The porous layer was coated with $SiO_2$ binder coating liquid (2-4) in the same manner as in Example 2-1. Subsequently, fluororesin/alkylsilazane compound solution 10 (acrylic fluororesin having a fluorinated hydrocarbon group/1,3-bis(3,3,3-trifluoropropyl)-1,1,3,3-tetramethyldisilazane=1/2.5) was applied and heated instead of the fluororesin solution. Thus, application of the acrylic fluororesin having a fluorinated hydrocarbon group and alkylsilylation were simultaneously performed on the porous layer in which $SiO_2$ hollow particles were bound to each other with the binder.

The porous layer of the resulting optical member had a refractive index of 1.251 and a thickness of 120 nm, and the contact angles of pure water and hexadecane on the porous layer were 113° and 72°, respectively. In the wipe-off test of the porous layer onto which hexadecane had been dropped, no traces of droplets nor marks after wiping were observed. The variation in refractive index in the high temperature, high humidity test was as small as less than 0.01.

The XPS analysis of the porous layer in the depth direction showed that fluorine was concentrated at the surface of the porous layer and that large amounts of carbon and fluorine were present in a shallow region from the surface. These results suggest that the fluororesin is present on the porous layer and that the $SiO_2$ hollow particles in the vicinity of the surface of the porous layer was modified with 3,3,3-trifluoropropyldimethylsilyl groups.

Example 2-15

In Example 2-15, a porous layer made of only chainlike $SiO_2$ particles was formed on a glass substrate (nd=1.77, vd=50) of 30 mm in diameter and 1 mm in thickness in the same manner as in Example 2-1. The porous layer was coated with $SiO_2$ binder coating liquid (2-4) in the same manner as in Example 2-1. Subsequently, fluororesin/alkylsilazane compound solution 12 (acrylic fluororesin having a fluorinated hydrocarbon group/1,1,3,3-tetramethydisilazane=1/2.5) was applied and heated instead of the fluororesin solution. Thus, application of the acrylic fluororesin having a fluorinated hydrocarbon group and alkylsilylation were simultaneously performed on the porous layer in which chainlike $SiO_2$ particles were bound to each other with the binder.

The porous layer of the resulting optical member had a refractive index of 1.253 and a thickness of 121 nm, and the contact angles of pure water and hexadecane on the porous layer were 116° and 70°, respectively. In the wipe-off test of the porous layer onto which hexadecane had been dropped, no traces of droplets nor marks after wiping were observed. The variation in refractive index in the high temperature, high humidity test was as small as less than 0.01.

The XPS analysis of the porous layer in the depth direction showed that fluorine was concentrated at the surface of the porous layer and that a large amount of carbon was present in a shallow region from the surface. These results suggest that the fluororesin is present on the porous layer and that the chainlike SiO$_2$ particles in the vicinity of the surface of the porous layer was modified with dimethylsilyl groups.

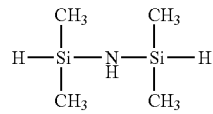

1,1,3,3-Tetramethyldisilazane

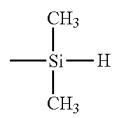

Dimethylsilyl Group

Example 2-16

In Example 2-16, a porous layer made of only chainlike SiO$_2$ particles was formed on a glass substrate (nd=1.77, vd=50) of 30 mm in diameter and 1 mm in thickness in the same manner as in Example 2-1. The porous layer was coated with SiO$_2$ binder coating liquid (2-4) in the same manner as in Example 2-1. Subsequently, fluororesin/alkylsilazane compound solution 13 (acrylic fluororesin having a fluorinated hydrocarbon group/2,2,4,4,6,6-hexamethylcyclotrisilazane=1/0.3) was applied and heated instead of the fluororesin solution. Thus, application of the acrylic fluororesin having a fluorinated hydrocarbon group and alkylsilylation were simultaneously performed on the porous layer in which chainlike SiO$_2$ particles were bound to each other with the binder.

The porous layer of the resulting optical member had a refractive index of 1.255 and a thickness of 119 nm, and the contact angles of pure water and hexadecane on the porous layer were 113° and 60°, respectively. In the wipe-off test of the porous layer onto which hexadecane had been dropped, no traces of droplets nor marks after wiping were observed. The variation in refractive index in the high temperature, high humidity test was as small as less than 0.01.

The XPS analysis of the porous layer in the depth direction showed that fluorine was concentrated at the surface of the porous layer and that a large amount of carbon was present in a shallow region from the surface. These results suggest that the fluororesin is present on the porous layer and that the chainlike SiO$_2$ particles in the vicinity of the surface of the porous layer was modified with dimethylsilylene groups.

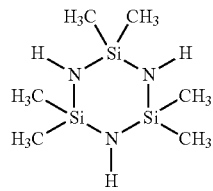

2,2,4,4,6,6-Hexamethylcyclotrisilazane

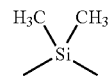

Dimethylsilylene Group

Example 2-17

In Example 2-17, a porous layer made of only chainlike SiO$_2$ particles was formed on a glass substrate (nd=1.77, vd=50) of 30 mm in diameter and 1 mm in thickness in the same manner as in Example 2-1. The porous layer was coated with SiO$_2$ binder coating liquid (2-4) in the same manner as in Example 2-1. Subsequently, fluororesin/alkylsilazane compound solution 14 (acrylic fluororesin having a fluorinated hydrocarbon group/2,2,4,4,6,6-hexamethylcyclotrisilazane=1/0.2) was applied and heated instead of the fluororesin solution. Thus, application of the acrylic fluororesin having a fluorinated hydrocarbon group and alkylsilylation were simultaneously performed on the porous layer in which chainlike SiO$_2$ particles were bound to each other with the binder.

The porous layer of the resulting optical member had a refractive index of 1.254 and a thickness of 120 nm, and the contact angles of pure water and hexadecane on the porous layer were 113° and 63°, respectively. In the wipe-off test of the porous layer onto which hexadecane had been dropped, no traces of droplets nor marks after wiping were observed. The variation in refractive index in the high temperature, high humidity test was as small as less than 0.01.

The XPS analysis of the porous layer in the depth direction showed that fluorine was concentrated at the surface of the porous layer and that a large amount of carbon was present in a shallow region from the surface. These results suggest that the fluororesin is present on the porous layer and that the chainlike SiO$_2$ particles in the vicinity of the surface of the porous layer was modified with dimethylsilylene groups.

Example 2-18

In Example 2-18, a porous layer made of only SiO$_2$ hollow particles was formed on a glass substrate (nd=1.77, vd=50) of 30 mm in diameter and 1 mm in thickness in the same manner as in Example 2-2. The porous layer was coated with SiO$_2$ binder coating liquid (2-4) in the same manner as in Example 2-1. Subsequently, fluororesin/alkylsilazane compound solution 14 (acrylic fluororesin having a fluorinated hydrocarbon group/2,2,4,4,6,6-hexamethylcyclotrisilazane=1/0.2) was applied and heated instead of the fluororesin solution. Thus, application of the acrylic fluororesin having a fluorinated hydrocarbon group and alkylsilylation were simultaneously performed on the porous layer in which SiO$_2$ hollow particles were bound to each other with the binder.

The porous layer of the resulting optical member had a refractive index of 1.252 and a thickness of 119 nm, and the contact angles of pure water and hexadecane on the porous layer were 112° and 63°, respectively. In the wipe-off test of the porous layer onto which hexadecane had been dropped, no traces of droplets nor marks after wiping were observed.

The variation in refractive index in the high temperature, high humidity test was as small as less than 0.01.

The XPS analysis of the porous layer in the depth direction showed that fluorine was concentrated at the surface of the porous layer and that a large amount of carbon was present in a shallow region from the surface. These results suggest that the fluororesin is present on the porous layer and that the surfaces of the $SiO_2$ hollow particles in the vicinity of the surface of the porous layer were modified with dimethylsilylene groups.

Example 2-19

In Example 2-19, a porous layer made of only $SiO_2$ spherical particles was formed on a glass substrate (nd=1.77, vd=50) of 30 mm in diameter and 1 mm in thickness in the same manner as in Example 2-9. The porous layer was coated with $SiO_2$ binder coating liquid (2-4) in the same manner as in Example 2-1. Subsequently, fluororesin/alkylsilazane compound solution 14 (acrylic fluororesin having a fluorinated hydrocarbon group/2,2,4,4,6,6-hexamethylcyclotrisilazane=1/0.2) was applied and heated instead of fluororesin/alkylsilazane compound solution 6. Thus, application of the acrylic fluororesin having a fluorinated hydrocarbon group and alkylsilylation were simultaneously performed on the porous layer in which $SiO_2$ spherical particles were bound to each other with the binder.

The porous layer of the resulting optical member had a refractive index of 1.345 and a thickness of 120 nm, and the contact angles of pure water and hexadecane on the porous layer were 107° and 61°, respectively. In the wipe-off test of the porous layer onto which hexadecane had been dropped, no traces of droplets nor marks after wiping were observed. The variation in refractive index in the high temperature, high humidity test was as small as less than 0.01.

The XPS analysis of the porous layer in the depth direction showed that fluorine was concentrated at the surface of the porous layer and that a large amount of carbon was present in a shallow region from the surface. These results suggest that the fluororesin is present on the porous layer and that the surfaces of the $SiO_2$ spherical particles in the vicinity of the surface of the porous layer were modified with dimethylsilylene groups.

Example 2-20

In Example 2-20, a porous layer made of only chainlike $SiO_2$ particles was formed on a glass substrate (nd=1.77, vd=50) of 30 mm in diameter and 1 mm in thickness in the same manner as in Example 2-1. The porous layer was coated with $SiO_2$ binder coating liquid (2-4) in the same manner as in Example 2-1. Subsequently, fluororesin/alkylsilazane compound solution 15 (acrylic fluororesin having a fluorinated hydrocarbon group/bis(dimethylamino)dimethylsilane=1/0.3) was applied and heated instead of the fluororesin solution. Thus, application of the acrylic fluororesin having a fluorinated hydrocarbon group and alkylsilylation were simultaneously performed on the porous layer in which chainlike $SiO_2$ particles were bound to each other with the binder.

The porous layer of the resulting optical member had a refractive index of 1.255 and a thickness of 119 nm, and the contact angles of pure water and hexadecane on the porous layer were 111° and 61°, respectively. In the wipe-off test of the porous layer onto which hexadecane had been dropped, no traces of droplets nor marks after wiping were observed. The variation in refractive index in the high temperature, high humidity test was as small as less than 0.01.

The XPS analysis of the porous layer in the depth direction showed that fluorine was concentrated at the surface of the porous layer and that a large amount of carbon was present in a shallow region from the surface. These results suggest that the fluororesin is present on the porous layer and that the surfaces of the chainlike $SiO_2$ particles in the vicinity of the surface of the porous layer were modified with dimethylsilylene groups.

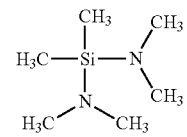

Bis(dimethylamino)dimethylsilane

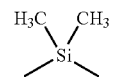

Dimethylsilylene Group

Comparative Example 2-3

In Comparative Example 2-3, a porous layer made of only chainlike $SiO_2$ particles was formed on a glass substrate (nd=1.77, vd=50) of 30 mm in diameter and 1 mm in thickness in the same manner as in Example 2-1. The porous layer was coated with $SiO_2$ binder coating liquid (2-4) in the same manner as in Example 2-1. Subsequently, undiluted 1,1,1,3,3,3-hexamethyldisilazane was applied instead of the fluororesin solution, followed by heating. Thus, the porous layer in which chainlike $SiO_2$ particles were bound to each other with the binder was alkylsilylated.

The porous layer of the resulting optical member had a refractive index of 1.245 and a thickness of 117 nm, and the contact angles of pure water and hexadecane on the porous layer were 38° and less than 10°, respectively. In the wipe-off test of the porous layer onto which hexadecane had been dropped, both a trace of droplets and a mark after wiping were observed. The variation in refractive index in the high temperature, high humidity test was 0.032.

The XPS analysis of the porous layer in the depth direction showed that a large amount of carbon was present in a shallow region from the surface of the porous layer. This suggests that the surfaces of the chainlike $SiO_2$ particles in the vicinity of the surface of the porous layer were modified with trimethylsilyl groups.

Comparative Example 2-4

In Comparative Example 2-4, a porous layer made of only chainlike $SiO_2$ particles was formed on a glass substrate (nd=1.77, vd=50) of 30 mm in diameter and 1 mm in thickness in the same manner as in Example 2-1. The porous layer was coated with $SiO_2$ binder coating liquid (2-4) in the same manner as in Example 2-1. Subsequently, undiluted 1,3-bis(3,3,3-trifluoropropyl)-1,1,3,3-tetramethyldisilazane was applied instead of the fluororesin solution. Thus, the porous layer in which chainlike SiO$_2$ particles were bound to each other with the binder was alkylsilylated.

The porous layer of the resulting optical member had a refractive index of 1.245 and a thickness of 117 nm, and the contact angles of pure water and hexadecane on the porous layer were 30° and less than 10°, respectively. In the wipe-off test of the porous layer onto which hexadecane had been dropped, both a trace of droplets and a mark after wiping were observed. The variation in refractive index in the high temperature, high humidity test was 0.035.

The XPS analysis of the porous layer in the depth direction showed that large amounts of fluorine and carbon were present in a shallow region from the surface of the porous layer. This suggests that the surfaces of the chainlike SiO$_2$ particles in the vicinity of the surface of the porous layer were modified with 3,3,3-trifluoropropyldimethylsilyl groups.

TABLE 4

| | ①Particles | Solution No. | Fluororesin | Alkylsilazane compound | Fluorine/ alkylsilazane ratio |
|---|---|---|---|---|---|
| Example 2-5 | Chain | 5 | Applied | 1,1,1,3,3,3-Hexamethyldisilazane | 1/5 |
| Example 2-6 | Chain | 6 | Applied | 1,1,1,3,3,3-Hexamethyldisilazane | 1/2.5 |
| Example 2-7 | Chain | 7 | Applied | 1,1,1,3,3,3-Hexamethyldisilazane | 1/0.2 |
| Example 2-8 | Hollow | 6 | Applied | 1,1,1,3,3,3-Hexamethyldisilazane | 1/2.5 |
| Example 2-9 | Spherical | 6 | Applied | 1,1,1,3,3,3-Hexamethyldisilazane | 1/2.5 |
| Example 2-10 | Chain | 8 | Applied | Dimethylaminotrimethylsilane | 1/2.5 |
| Example 2-11 | Chain | 9 | Applied | N,O-bis(trimethylsilyl)acetamide | 1/2.5 |
| Example 2-12 | Chain | 10 | Applied | 1,3-Bis(3,3,3-trifluoropropyl)-1,1,3,3-tetramethyldisilazane | 1/2.5 |
| Example 2-13 | Chain | 11 | Applied | 1,3-Bis(3,3,3-trifluoropropyl)-1,1,3,4-tetramethyldisilazane | 1/0.2 |
| Example 2-14 | Hollow | 10 | Applied | 1,3-Bis(3,3,3-trifluoropropyl)-1,1,3,5-tetramethyldisilazane | 1/2.5 |
| Example 2-15 | Chain | 12 | Applied | 1,1,3,3-Tetramethyldisilazane | 1/2.5 |
| Example 2-16 | Chain | 13 | Applied | 2,2,4,4,6,6-Hexamethylcyclotrisilazane | 1/0.3 |
| Example 2-17 | Chain | 14 | Applied | 2,2,4,4,6,7-Hexamethylcyclotrisilazane | 1/0.2 |
| Example 2-18 | Hollow | 14 | Applied | 2,2,4,4,6,8-Hexamethylcyclotrisilazane | 1/0.2 |
| Example 2-19 | Spherical | 14 | Applied | 2,2,4,4,6,9-Hexamethylcyclotrisilazane | 1/0.3 |
| Example 2-20 | Chain | 15 | Applied | Bis(dimethylamino)dimethylsilane | 1/0.3 |
| Comparative Example 2-3 | Chain | — | Not applied | 1,1,1,3,3,3-Hexamethyldisilazane | 0/1 |
| Comparative Example 2-4 | Chain | — | Not applied | 1,3-Bis(3,3,3-trifluoropropyl)-1,1,3,3-tetramethyldisilazane | 0/1 |

| | Thickness nm | Refractive index λ: 550 nm | Contact angle (degree) Pure water | Hexadecane | EtOH Marks after wiping | Reliability |
|---|---|---|---|---|---|---|
| Example 2-5 | 120 | 1.253 | A117 | A64 | A: Not observed | A |
| Example 2-6 | 120 | 1.252 | A117 | A65 | A: Not observed | A |
| Example 2-7 | 120 | 1.251 | A113 | A69 | A: Not observed | A |
| Example 2-8 | 118 | 1.250 | A115 | A65 | A: Not observed | A |
| Example 2-9 | 117 | 1.343 | B105 | A70 | A: Not observed | A |
| Example 2-10 | 120 | 1.252 | A116 | A64 | A: Not observed | A |
| Example 2-11 | 120 | 1.252 | A117 | A65 | A: Not observed | A |
| Example 2-12 | 120 | 1.253 | A115 | A67 | A: Not observed | A |
| Example 2-13 | 120 | 1.251 | A112 | A72 | A: Not observed | A |
| Example 2-14 | 118 | 1.251 | A113 | A72 | A: Not observed | A |
| Example 2-15 | 121 | 1.253 | A116 | A70 | A: Not observed | A |
| Example 2-16 | 119 | 1.255 | A113 | A60 | A: Not observed | A |

TABLE 4-continued

| | | | | | | |
|---|---|---|---|---|---|---|
| Example 2-17 | 120 | 1.254 | A113 | A63 | A: Not observed | A |
| Example 2-18 | 119 | 1.252 | A112 | A63 | A: Not observed | A |
| Example 2-19 | 120 | 1.345 | B107 | A61 | A: Not observed | A |
| Example 2-20 | 119 | 1.255 | A111 | A61 | A: Not observed | A |
| Comparative Example 2-3 | 117 | 1.245 | C38 | B < 10 | B: Observed | B |
| Comparative Example 2-4 | 117 | 1.245 | C30 | B < 10 | B: Observed | B |

Evaluation of Examples and Comparative Examples

The porous layers of the optical members of Examples 2-1 to 2-20 exhibited low refractive indices of 1.25 to 1.35, and the contact angles of hexadecane on the antireflection film (porous layer) thereof were 60° to 72°. Thus, the antireflection films of the Examples are superior in oil repellency and allow oil attached thereon to be easily removed. In addition, a fluororesin was attached onto the porous layer and the surfaces of the silicon oxide particles in the vicinity of the porous layer were alkylsilylated. Consequently, the optical members of Examples 2-1 to 2-20 exhibited a small variation in refractive index in a high temperature, high humidity test. On the other hand, in Comparative Examples 2-1 to 2-4, in which either application of fluororesin or alkylsilylation was not performed, the optical members did not allow oil attached thereto to be easily removed and exhibited a large variation in refractive index in the high temperature, high humidity test, compared to the optical members of Examples 2-1 to 2-20.

The optical member according to the present disclosure can be used in, for example, imaging apparatuses, such as cameras and video cameras, and optical scanning apparatuses, such as liquid crystal projectors and electrophotographic apparatuses.

The optical member of the second embodiment has good optical properties and antifouling property.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-180066, filed Sep. 11, 2015 and No. 2015-180067, filed Sep. 11, 2015, which are hereby incorporated by reference herein in their entirety.

What is claimed is:

1. An optical member comprising:
   a substrate; and
   a porous layer containing silicon oxide particles and a binder, the porous layer having a reflectance reducing effect,
   wherein the optical member has a plurality of regions discontinuously distributed on the porous layer to form a surface layer of the porous layer, the plurality of regions containing an acrylic fluororesin,
   wherein a contact angle of n-hexadecane on a surface of the optical member on a side where the plurality of regions are provided is in a range of 50° to 80°,
   wherein an atomic ratio of fluorine to silicon at the surface of the optical member on the side where the plurality of regions are provided is in a range of 0.5 to 3,
   wherein the optical member is free of fluoroalkyl silane, and
   wherein the plurality of regions are free of a perfluoropolyether-containing compound and free of polytetrafluoroethylene.

2. The optical member according to claim 1, wherein the porous layer contains chain-shaped silicon oxide particles.

3. The optical member according to claim 2, wherein the surface layer has a part where the acrylic fluororesin permeates into the porous layer, and
   wherein an atomic ratio of a fluorine concentration at the surface of the optical member on the side where the plurality of regions are provided to a fluorine concentration at a depth of 25 nm from the surface of the optical member on the side where the plurality of regions are provided is in a range of 4 to 12.

4. The optical member according to claim 2, wherein a refractive index of the porous layer increases in a direction from a surface of the porous layer on a side where the plurality of regions are provided to a surface of the porous layer on a side where the substrate is provided.

5. The optical member according to claim 2, wherein a porosity of the porous layer decreases in a direction from a surface of the porous layer on a side where the plurality of regions are provided to a surface of the porous layer on a side where the substrate is provided.

6. The optical member according to claim 2, wherein the binder is a silicon oxide binder.

7. The optical member according to claim 1, wherein at least part of the silicon oxide particles at the surface of the porous layer has an alkylsilyl group.

8. The optical member according to claim 7, wherein chain-shaped silicon oxide particles account for 50% or more by mass of the silicon oxide particles.

9. The optical member according to claim 7, wherein hollow particles account for 50% or more by mass of the silicon oxide particles.

10. The optical member according to claim 7, wherein the binder is a silicon oxide binder.

11. The optical member according to claim 7, wherein the alkylsilyl group is represented by one of the following formulas (2) and (3):

(2)

wherein R1 represents a hydrogen atom or a monovalent organic group selected from the group consisting of linear or branched alkyl groups having a carbon number of 1 to 8, and alkenyl groups; and

(3)

wherein R2 represents a monovalent organic group selected from the group consisting of linear or branched alkyl group having a carbon number of 1 to 8, and alkenyl groups.

12. An optical member comprising:
a substrate; and
a porous layer having an antireflection effect provided on the substrate,
wherein the porous layer contains silicon oxide particles and a binder,
wherein the optical member has a plurality of regions discontinuously distributed on the porous layer to form a surface of the porous layer on an opposite side where the substrate is provided, the plurality of regions having an acrylic fluororesin having a fluorocarbon group,
wherein a contact angle of n-hexadecane on the surface of the optical member is in a range of 50° to 80°,
wherein an atomic ratio of fluorine to silicon at a surface of the optical member on a side where the porous layer is formed is in a range of 0.5 to 3,
wherein an atomic ratio of a fluorine concentration at the surface of the optical member on the side where the porous layer is formed to a fluorine concentration at a depth of 25 nm from the surface of the optical member on the side where the porous layer is formed is in a range of 4 to 12,
wherein the optical member is free of fluoroalkyl silane, and
wherein the plurality of regions are free of a perfluoropolyether-containing compound and free of polytetrafluoroethylene.

13. The optical member according to claim 12, wherein the porous layer contains chain-shaped silicon oxide particles.

14. The optical member according to claim 13, wherein the binder is a silicon oxide binder.

15. The optical member according to claim 12, wherein at least part of the silicon oxide particles at the surface of the porous layer has an alkylsilyl group.

16. An imaging apparatus comprising the optical member according to claim 12.

17. A method for manufacturing an optical member including a substrate and an antireflection film having a surface defined by a porous layer, the method comprising:
forming on the substrate a porous layer in which silicon oxide particles are bound to each other with a binder, the porous layer having a reflectance reducing effect; and
providing a plurality of fluororesin regions discontinuously distributed onto the porous layer so as to have an atomic ratio of fluorine to silicon at a surface of the porous layer in a range of 0.5 to 3,
wherein a contact angle of n-hexadecane on the surface of the antireflection film is in a range of 50° to 80°,
wherein the providing of the plurality of fluororesin regions includes applying a solution of a fluororesin onto the porous layer, the solution of the fluororesin including an acrylic fluororesin, wherein the optical member is free of fluoroalkyl silane, and
wherein the plurality of fluororesin regions are free of a perfluoropolyether-containing compound and free of polytetrafluoroethylene.

18. The method according to claim 17, wherein the porous layer is formed by applying a dispersion liquid containing chain-shaped silicon oxide particles and a binder.

19. The method according to claim 17, wherein the porous layer formed is dry to the touch.

20. The method according to claim 17, further comprising alkylsilylating the silicon oxide particles in a vicinity of the surface of the porous layer.

21. The method according to claim 20, wherein the alkylsilylating is performed by exposing the porous layer to an atmosphere of an alkylsilazane compound.

22. The method according to claim 21, wherein the alkylsilazane compound contains a compound represented by one of the following formulas (5), (6), and (7):

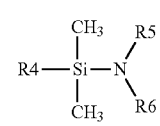
(5)

wherein R4 represents a hydrogen atom or a monovalent organic group selected from the group consisting of linear or branched alkyl groups having a carbon number of 1 to 8, and alkenyl groups, and R5 and R6 each represent a species selected from the group consisting of a hydrogen atom, alkyl groups having a carbon number of 1 to 3, and an acetyl group, or form an imidazoline ring together,

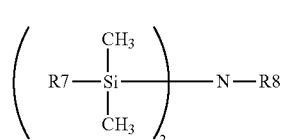
(6)

wherein R7 represents a hydrogen atom or a monovalent organic group selected from the group consisting of linear or branched alkyl groups having a carbon number of 1 to 8, and alkenyl groups, and R8 represents a hydrogen atom or an alkyl group having a carbon number of 1 to 3, and

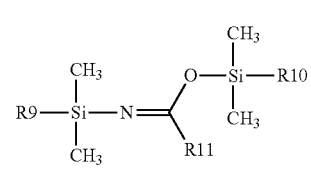
(7)

wherein R9 and R10 each represent a monovalent organic group selected from the group consisting of linear or branched alkyl groups having a carbon number of 1 to 8, and alkenyl groups, and R11 represents a methyl group.

23. The method according to claim 21, wherein the alkylsilazane compound contains a compound represented by one of the following formulas (8) and (9):

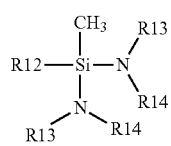
(8)

wherein R12 represents a monovalent organic group selected from the group consisting of linear or branched alkyl groups having a carbon number of 1 to 8, and alkenyl groups, and R13 and R14 each represent a hydrogen atom or an alkyl group having a carbon number of 1 to 3,

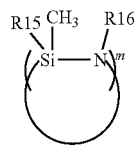
(9)

wherein R15 represents a monovalent organic group selected from the group consisting of linear or branched alkyl groups having a carbon number of 1 to 8, and alkenyl groups, and R16 represents a hydrogen atom or an alkyl group having a carbon number of 1 to 3, and m is an integer of 3 or 4.

24. The method according to claim 20, wherein the alkylsilylating is performed by applying a solution of an alkylsilazane compound onto the porous layer.

25. The method according to claim 20, wherein the providing of the plurality of fluororesin regions and the alkylsilylating are simultaneously performed.

26. The method according to claim 25, wherein the acrylic fluororesin has a fluorocarbon group and the solution includes an alkylsilazane compound.

27. The method according to claim 17, wherein the acrylic fluororesin has a fluorocarbon group.

* * * * *